United States Patent
Kim et al.

(10) Patent No.: US 12,483,689 B2
(45) Date of Patent: **\*Nov. 25, 2025**

(54) METHOD AND DEVICE FOR PROCESSING VIDEO SIGNAL USING MPM CONFIGURATION METHOD FOR MULTIPLE REFERENCE LINES

(71) Applicant: SAMSUNG ELECTRONICS CO., LTD., Suwon-si (KR)

(72) Inventors: Dongcheol Kim, Suwon-Si (KR); Geonjung Ko, Seoul (KR); Jaehong Jung, Seoul (KR); Juhyung Son, Uiwang-Si (KR); Jinsam Kwak, Anyang-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,506

(22) Filed: Aug. 10, 2022

(65) Prior Publication Data

US 2022/0385893 A1 Dec. 1, 2022

Related U.S. Application Data

(63) Continuation of application No. 17/223,419, filed on Apr. 6, 2021, now Pat. No. 11,470,306, which is a (Continued)

(30) Foreign Application Priority Data

Oct. 7, 2018 (KR) .................. 10-2018-0119455
Oct. 12, 2018 (KR) .................. 10-2018-0121530
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 10,419,754 B1   9/2019  Zhao
11,470,306 B2 * 10/2022 Kim .................. H04N 19/176
(Continued)

FOREIGN PATENT DOCUMENTS

CN   103200401 A   7/2013
CN   107409227 A   11/2017
(Continued)

OTHER PUBLICATIONS

"CE3-5.1: On cross-component linear model simplification". Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0191.
(Continued)

*Primary Examiner* — Lindsay J Uhl
(74) *Attorney, Agent, or Firm* — Sughrue Mion, PLLC

(57) ABSTRACT

A video signal processing device comprises a processor configured to: obtain an index of intra prediction mode of a current block, obtain a reference sample line index for the current block, and generate a plurality of reference samples and a plurality of additional reference samples based on a direction of the intra prediction mode. The direction of the intra prediction mode is determined based on the index, and a number of the plurality of additional reference samples
(Continued)

determined based on the reference sample line index and/or a ratio of a width of the current block and a height of the current block.

3 Claims, 27 Drawing Sheets

Related U.S. Application Data continuation of application No. PCT/KR2019/013137, filed on Oct. 7, 2019.

(30) Foreign Application Priority Data

| | | |
|---|---|---|
| Oct. 23, 2018 | (KR) | 10-2018-0126681 |
| Nov. 9, 2018 | (KR) | 10-2018-0137708 |
| Feb. 21, 2019 | (KR) | 10-2019-0020241 |
| Apr. 18, 2019 | (KR) | 10-2019-0045260 |
| May 3, 2019 | (KR) | 10-2019-0052222 |

(51) Int. Cl.
*H04N 19/159* (2014.01)
*H04N 19/176* (2014.01)

(56) References Cited

U.S. PATENT DOCUMENTS

| | | | |
|---|---|---|---|
| 2016/0373741 A1 | 12/2016 | Zhao et al. | |
| 2016/0373770 A1 | 12/2016 | Zhao et al. | |
| 2018/0041774 A1 | 2/2018 | Zhu et al. | |
| 2018/0048895 A1 | 2/2018 | Jeon et al. | |
| 2018/0063527 A1 | 3/2018 | Chen et al. | |
| 2018/0146191 A1 | 5/2018 | Jiang et al. | |
| 2018/0255295 A1 | 9/2018 | Lee et al. | |
| 2019/0222837 A1 | 7/2019 | Lee et al. | |
| 2020/0389650 A1 | 12/2020 | Laroche et al. | |
| 2020/0413062 A1 | 12/2020 | Onno et al. | |
| 2021/0105461 A1 | 4/2021 | Lee | |
| 2021/0136392 A1 | 5/2021 | Ma et al. | |
| 2021/0136409 A1 | 5/2021 | Ma et al. | |
| 2021/0227208 A1* | 7/2021 | Lee | H04N 19/159 |
| 2021/0227235 A1 | 7/2021 | Chen et al. | |
| 2021/0227240 A1 | 7/2021 | Chen et al. | |
| 2021/0250577 A1* | 8/2021 | Leleannec | H04N 19/11 |
| 2021/0258608 A1* | 8/2021 | Filippov | H04N 19/182 |
| 2022/0030226 A1* | 1/2022 | Lee | H04N 19/105 |
| 2022/0060720 A1 | 2/2022 | Lee | |
| 2022/0377323 A1* | 11/2022 | Lee | H04N 19/593 |

FOREIGN PATENT DOCUMENTS

| | | |
|---|---|---|
| CN | 107743705 A | 2/2018 |
| CN | 108353164 A | 7/2018 |
| EP | 2391129 A1 | 11/2011 |
| GB | 2567249 A | 4/2019 |
| KR | 101501642 B1 | 3/2010 |
| KR | 10-2013-0045152 A | 5/2013 |
| KR | 101588144 B1 | 3/2014 |
| KR | 10-2014-0071429 A | 6/2014 |
| KR | 1020170071594 A | 6/2017 |
| KR | 10-2018-0001479 A | 1/2018 |
| KR | 10-2018-0011285 A | 1/2018 |
| KR | 1020180001478 A | 1/2018 |
| KR | 10-2018-0014109 A | 2/2018 |
| KR | 1020180110201 A | 10/2018 |
| WO | 2016/148513 A1 | 9/2016 |
| WO | 2016-198169 A1 | 12/2016 |
| WO | 2017190288 A1 | 11/2017 |
| WO | 2018/016823 A1 | 1/2018 |
| WO | 2018012808 A | 1/2018 |
| WO | 2019162116 A1 | 8/2019 |
| WO | 2020076142 A1 | 4/2020 |
| WO | 2020141598 A1 | 7/2020 |

OTHER PUBLICATIONS

Examination report under sections 12 & 13 of the Patents Act, 1970 and the Patents Rules, 2003 for Application No. 202127016362 from Intellectual Property of India. Oct. 2, 2022.
Examination report under sections 12 & 13 of the Patents Act, 1970 and the Patents Rules, 2003 for Application No. 202127016390 from Intellectual Property of India. Feb. 14, 2022.
"Non-CE3: A unified luma intra mode list construction process". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0528.
JVET-M0528-xlsm(ExcelChart).
"Non-CE3: A unified luma intra mode list construction process". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0528_r1.
JVET-M0528—additional-encorder-only-changes_xlsm(ExcelChart).
JVET-M0528_Modification to VVC WD.
JVET-M0210_Test1_xslm (Excel Chart).
JVET-M0210_Test2_xslm (Excel Chart).
JVET-M0210_Test3_xslm (Excel Chart).
"Non-CE3: Intra prediction information coding". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0210_v1.
"JVET-M0210 Non-CE3: Intra prediction information coding" Fujitsu 13thJVET Meeting: Marrakech, MA, Jan. 9-18, 2019 (PPT).
"Non-CE3: Intra prediction information coding". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0210_v2(r1) (mark-up).
"Non-CE3: Intra prediction information coding". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0210_v3(r2) (mark-up).
JVET-M0210_VVC_Draft_Text_Jan. 6, 2019.
Office Action of U.S. Appl. No. 17/282,745 dated Feb. 4, 2022.
English Translation of Written Opinion of International application No. PCT/KR2019/013137. Jan. 17, 2020.
International Search Report of International application No. PCT/KR2019/013449. Feb. 14, 2020.
English Translation of Written Opinion of International application No. PCT/KR2019/013449. Feb. 14, 2020.
International Search Report of International application No. PCT/KR2019/013 137. Jan. 17, 2020.
Written Opinion of International application No. PCT/KR2019/013 137. Jan. 17, 2020.
"CE3-related: Advanced MPM based on intra reference line selection scheme". Joint Video Experts Team (JVET) of ITU-T SG 16 WP 3 and ISO/IEC JTC 1/SC 29/WG 11 11th Meeting: Ljubljana, SI, Jul. 10-18, 2018.
Non-Final Rejection of U.S. Appl. No. 17/223,419 from the USPTO dated May 18, 2022.
Notice of Allowance of U.S. Appl. No. 17/223,419 from the USPTO dated Jul. 5, 2022.
Communication dated Jul. 5, 2023 issued by the National Intellectual Property Administration, PRC in counterpart Chinese Application No. 201980065805.5.
Communication issued on Dec. 28, 2023 by the Chinese Patent Office in corresponding CN Patent Application No. 201980065805.5.

* cited by examiner

| coding_unit( x0, y0, cbWidth, cbHeight, treeType ) { | Descriptor |
|---|---|
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 ) | |
|       pred_mode_flag | ae(v) |
|   } | |
|   if( CuPredMode[ x0 ][ y0 ] == MODE_INTRA ) { | |
|     if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE \|\| treeType == DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] == 0 && ( cbWidth <= MaxTbSizeY \|\| cbHeight <= MaxTbSizeY ) && ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] == 1 && cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] == 0 && intra_subpartitions_mode_flag[ x0 ][ y0 ] == 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType == SINGLE_TREE \|\| treeType == DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER */ | |

Coding unit syntax structure

FIG. 12

| coding_unit( x0, y0, cbWidth, cbHeight, treeType ) { | Descriptor |
|---|---|
| ... | |
| if( CuPredMode[ x0 ][ y0 ] == MODE_INTRA ) { | |
| if( sps_pcm_enabled_flag &&<br>cbWidth >= MinIpcmCbSizeY && cbWidth <= MaxIpcmCbSizeY &&<br>cbHeight >= MinIpcmCbSizeY && cbHeight <= MaxIpcmCbSizeY ) | |
| pcm_flag[ x0 ][ y0 ] | ae(v) |
| if( pcm_flag[ x0 ][ y0 ] ) { | |
| while( !byte_aligned( ) ) | |
| pcm_alignment_zero_bit | f(1) |
| pcm_sample( cbWidth, cbHeight, treeType) | |
| } else { | |
| if( treeType == SINGLE_TREE || treeType == DUAL_TREE_LUMA ) { | |
| intra_mode_Planar_flag[ x0 ][ y0 ] | ae(v) |
| If(Intra_mode_Planar_flag[ x0 ][ y0 ] == 0 && ( y0 % CtbSizeY ) > 0 )) | |
| intra_luma_ref_idx[ x0 ][ y0 ] | ae(v) |
| if (intra_luma_ref_idx[ x0 ][ y0 ] == 0 &&<br>( cbWidth <= MaxTbSizeY || cbHeight <= MaxTbSizeY ) &&<br>( cbWidth * cbHeight > MinTbSizeY * MinTbSizeY )) | |
| intra_subpartitions_mode_flag[ x0 ][ y0 ] | |
| if( intra_subpartitions_mode_flag[ x0 ][ y0 ] == 1 &&<br>cbWidth <= MaxTbSizeY && cbHeight <= MaxTbSizeY ) | ae(v) |
| intra_subpartitions_split_flag[ x0 ][ y0 ] | ae(v) |
| if( intra_luma_ref_idx[ x0 ][ y0 ] == 0 &&<br>intra_subpartitions_mode_flag[ x0 ][ y0 ] == 0 &&<br>intra_mode_Planar_flag[ x0 ][ y0 ]==0) | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| else | |
| intra_luma_mpm_remainder[ x0 ][ y0 ] | ae(v) |
| } | |
| if( treeType == SINGLE_TREE || treeType == DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER */ | |
| ... | |

Coding unit syntax structure

FIG. 13

| coding_unit( x0, y0, cbWidth, cbHeight, treeType ) { | Descriptor |
|---|---|
| ... | |
| if( CuPredMode[ x0 ][ y0 ] = = MODE_INTRA ) { | |
| if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
| pcm_flag[ x0 ][ y0 ] | ae(v) |
| if( pcm_flag[ x0 ][ y0 ] ) { | |
| while( !byte_aligned( ) ) | |
| pcm_alignment_zero_bit | f(1) |
| pcm_sample( cbWidth, cbHeight, treeType) | |
| } else { | |
| if( treeType = = SINGLE_TREE \|\| treeType = = DUAL_TREE_LUMA ) { | |
| | |
| intra_mode_Planar_flag[ x0 ][ y0 ] | ae(v) |
| If(Intra_mode_Planar_flag[ x0 ][ y0 ] == 0 && ( y0 % CtbSizeY ) > 0 )) | |
| intra_luma_ref_idx[ x0 ][ y0 ] | ae(v) |
| if (intra_luma_ref_idx[ x0 ][ y0 ] = = 0 && ( cbWidth <= MaxTbSizeY \|\| cbHeight <= MaxTbSizeY ) && ( cbWidth * cbHeight > MinTbSizeY * MinTbSizeY ) && Intra_mode_Planar_flag[ x0 ][ y0 ] == 0) | |
| intra_subpartitions_mode_flag[ x0 ][ y0 ] | ae(v) |
| if( intra_subpartitions_mode_flag[ x0 ][ y0 ] = = 1 && cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && intra_subpartitions_mode_flag[ x0 ][ y0 ] = = 0 && intra_mode_Planar_flag[ x0 ][ y0 ]==0) | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| else | |
| intra_luma_mpm_remainder[ x0 ][ y0 ] | ae(v) |
| } | |
| if( treeType = = SINGLE_TREE \|\| treeType = = DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER */ | |
| ... | |

Coding unit syntax structure

FIG. 14

| coding_unit( x0, y0, cbWidth, cbHeight, treeType ) { | Descriptor |
|---|---|
| ... | |
| if( CuPredMode[ x0 ][ y0 ] == MODE_INTRA ) { | |
| if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
|   pcm_flag[ x0 ][ y0 ] | ae(v) |
| if( pcm_flag[ x0 ][ y0 ] ) { | |
|   while( !byte_aligned( ) ) | |
|     pcm_alignment_zero_bit | f(1) |
|   pcm_sample( cbWidth, cbHeight, treeType) | |
| } else { | |
| if( treeType == SINGLE_TREE || treeType == DUAL_TREE_LUMA ) { | |
| if( ( y0 % CtbSizeY ) > 0 ) | |
|   intra_luma_ref_idx[ x0 ][ y0 ] | ae(v) |
| if (intra_luma_ref_idx[ x0 ][ y0 ] == 0 && ( cbWidth <= MaxTbSizeY || cbHeight <= MaxTbSizeY ) && ( cbWidth * cbHeight > MinTbSizeY * MinTbSizeY )) | |
|   intra_subpartitions_mode_flag[ x0 ][ y0 ] | ae(v) |
| if( intra_subpartitions_mode_flag[ x0 ][ y0 ] == 1 && cbWidth <= MaxTbSizeY && cbHeight <= MaxTbSizeY ) | |
|   intra_subpartitions_split_flag[ x0 ][ y0 ] | |
| If(intra_luma_ref_idx[ x0 ][ y0 ] == 0) | |
|   intra_mode_Planar_flag[ x0 ][ y0 ] | ae(v) |
| if( intra_luma_ref_idx[ x0 ][ y0 ] == 0 && intra_subpartitions_mode_flag[ x0 ][ y0 ] == 0 && intra_mode_Planar_flag[ x0 ][ y0 ]==0 ) | |
|   intra_luma_mpm_flag[ x0 ][ y0 ] | ae(v) |
| if( intra_luma_mpm_flag[ x0 ][ y0 ] ) | |
|   intra_luma_mpm_idx[ x0 ][ y0 ] | ae(v) |
| else | |
|   intra_luma_mpm_remainder[ x0 ][ y0 ] | ae(v) |
| } | |
| if( treeType == SINGLE_TREE || treeType == DUAL_TREE_CHROMA ) | |
|   intra_chroma_pred_mode[ x0 ][ y0 ] | ae(v) |
| } | |
| } else if( treeType != DUAL_TREE_CHROMA ) { /* MODE_INTER */ | |
| ... | |

Coding unit syntax structure

FIG. 15

| coding_unit( x0, y0, cbWidth, cbHeight, treeType ) { | Descriptor |
|---|---|
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE || treeType = = DUAL_TREE_LUMA ) { | |
|         if( ( y0 % CtbSizeY ) > 0 ) | |
|           intra_luma_ref_idx[ x0 ][ y0 ] | ae(v) |
|           intra_mode_Planar_flag[ x0 ][ y0 ] | ae(v) |
|         if (intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && intra_subpartitions_mode_flag[ x0 ][ y0 ] = = 0 && intra_mode_Planar_flag[ x0 ][ y0 ] == 0) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE || treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER */ | |

FIG. 16

| coding_unit( x0, y0, cbWidth, cbHeight, treeType ) { | Descriptor |
|---|---|
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 ) | |
|       pred_mode_flag | ae(v) |
|   } | |
|   if( CuPredMode[ x0 ][ y0 ] == MODE_INTRA ) { | |
|     if(                   sps_pcm_enabled_flag ;                      &&<br>cbWidth >= MinIpcmCbSizeY && cbWidth <= MaxIpcmCbSizeY &&<br>cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE \|\| treeType == DUAL_TREE_LUMA ) { | |
|         if( ( y0 % CtbSizeY ) > 0 ) | |
|           intra_luma_ref_idx[ x0 ][ y0 ] | ae(v) |
|           intra_mode_Planar_flag[ x0 ][ y0 ] | ae(v) |
|         if    (intra_luma_ref_idx[    x0    ][    y0    ]    =    =    0    &&<br>    (  cbWidth  <=  MaxTbSizeY  &&  cbHeight  <=  MaxTbSizeY  )  &&<br>    ( cbWidth * cbHeight > MinTbSizeY * MinTbSizeY )) | |
|           intra_subpartitions_mode_flag[ x0 ][ y0 ] | ae(v) |
|         if(   intra_subpartitions_mode_flag[    x0    ][    y0    ]    =    =    1    &&<br>   cbWidth <= MaxTbSizeY && cbHeight <= MaxTbSizeY ) | |
|           intra_subpartitions_split_flag[ x0 ][ y0 ] | ae(v) |
|         if(    intra_luma_ref_idx[    x0    ][    y0    ]    =    =    0    &&<br>    intra_subpartitions_mode_flag[ x0 ][ y0 ] == 0 && intra_mode_Planar_flag[ x0 ][ y0 ] ==<br>0) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType == SINGLE_TREE \|\| treeType == DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER */ | |

*FIG. 17*

| coding_unit( x0, y0, cbWidth, cbHeight, treeType ) { | Descriptor |
|---|---|
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 ) | |
|       pred_mode_flag | ae(v) |
|   } | |
|   if( CuPredMode[ x0 ][ y0 ] == MODE_INTRA ) { | |
|     if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE || treeType == DUAL_TREE_LUMA ) { | |
|         if( ( y0 % CtbSizeY ) > 0 ) | |
|           intra_luma_ref_idx[ x0 ][ y0 ] | ae(v) |
|         if(intra_luma_ref_idx[x0][y0] == 0) | |
|           intra_mode_Planar_flag[ x0 ][ y0 ] | ae(v) |
|         if ( intra_luma_ref_idx[ x0 ][ y0 ] == 0 && ( cbWidth <= MaxTbSizeY && cbHeight <= MaxTbSizeY ) && ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] == 1 && cbWidth <= MaxTbSizeY && cbHeight <= MaxTbSizeY ) | |
|           intra_subpartitions_split_flag[ x0 ][ y0 ] | ae(v) |
|         if(intra_mode_Planar_flag[ x0 ][ y0 ] == 0) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType == SINGLE_TREE || treeType == DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER */ | |

*FIG. 18*

| coding_unit( x0, y0, cbWidth, cbHeight, treeType ) { | Descriptor |
|---|---|
|   if( tile_group_type != I ) { | |
|     if( treeType != DUAL_TREE_CHROMA ) | |
|      cu_skip_flag[ x0 ][ y0 ] | ae(v) |
|     if( cu_skip_flag[ x0 ][ y0 ] == 0 ) | |
|      pred_mode_flag | ae(v) |
|   } | |
|   if( CuPredMode[ x0 ][ y0 ] == MODE_INTRA ) { | |
|     if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
|      pcm_flag[ x0 ][ y0 ] | ae(v) |
|     if( pcm_flag[ x0 ][ y0 ] ) { | |
|      while( !byte_aligned( ) ) | |
|       pcm_alignment_zero_bit | f(1) |
|      pcm_sample( cbWidth, cbHeight, treeType) | |
|     } else { | |
|      if( treeType == SINGLE_TREE || treeType == DUAL_TREE_LUMA ) { | |
|       intra_mode_Planar_flag[ x0 ][ y0 ] | ae(v) |
|       if(intra_luma_Planar_flag[x0][y0] == 0 && y0 % CtbSizeY ) > 0 ) | |
|      intra_luma_ref_idx[ x0 ][ y0 ] | ae(v) |
|      if (intra_luma_ref_idx[ x0 ][ y0 ] == 0 && ( cbWidth <= MaxTbSizeY && cbHeight <= MaxTbSizeY ) && ( cbWidth * cbHeight > MinTbSizeY * MinTbSizeY )) | |
|       intra_subpartitions_mode_flag[ x0 ][ y0 ] | ae(v) |
|      if( intra_subpartitions_mode_flag[ x0 ][ y0 ] == 1 && cbWidth <= MaxTbSizeY && cbHeight <= MaxTbSizeY ) | |
|       intra_subpartitions_split_flag[ x0 ][ y0 ] | ae(v) |
|      if(intra_mode_Planar_flag[ x0 ][ y0 ] == 0) | |
|       intra_luma_mpm_flag[ x0 ][ y0 ] | ae(v) |
|      if( intra_luma_mpm_flag[ x0 ][ y0 ] ) | |
|       intra_luma_mpm_idx[ x0 ][ y0 ] | ae(v) |
|      else | |
|       intra_luma_mpm_remainder[ x0 ][ y0 ] | ae(v) |
|     } | |
|     if( treeType == SINGLE_TREE || treeType == DUAL_TREE_CHROMA ) | |
|      intra_chroma_pred_mode[ x0 ][ y0 ] | ae(v) |
|   } | |
|   } else if( treeType != DUAL_TREE_CHROMA ) { /* MODE_INTER */ | |

*FIG. 19*

| coding_unit( x0, y0, cbWidth, cbHeight, treeType ) { | Descriptor |
|---|---|
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE || treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && ( cbWidth <= MaxTbSizeY || cbHeight <= MaxTbSizeY ) && ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ){ | |
|           if(intra_luma_ref_idx[x0][y0]==0) | |
|             intra_luma_planar_flag[ x0 ][ y0 ] | ae(v) |
|           if(intra_luma_planar_flag[x0][y0]==0) | |
|             intra_luma_mpm_idx[ x0 ][ y0 ] | |
|         } else | |
|           intra_luma_mpm_remainder[ x0 ][ y0 ] | ae(v) |
|       } | |
|       if( treeType = = SINGLE_TREE || treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER */ | |

Coding unit syntax structure

FIG. 20

Neighboring modes for MPM generation

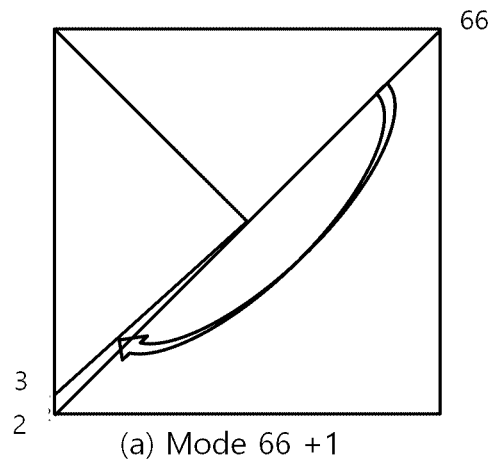
(a) Mode 66 +1
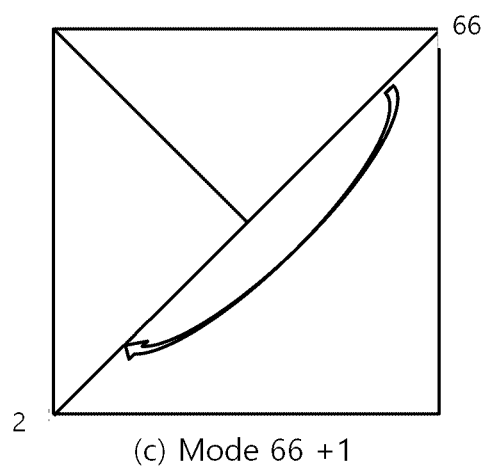
(c) Mode 66 +1
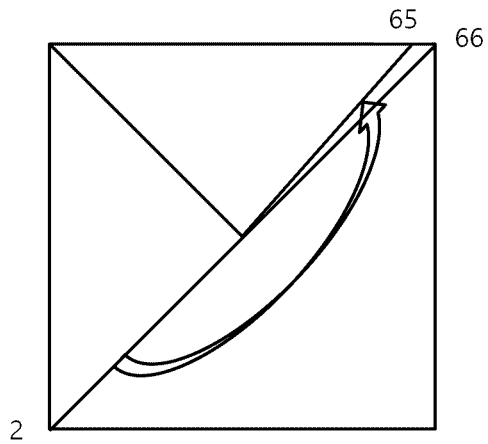
(b) Mode 2 - 1
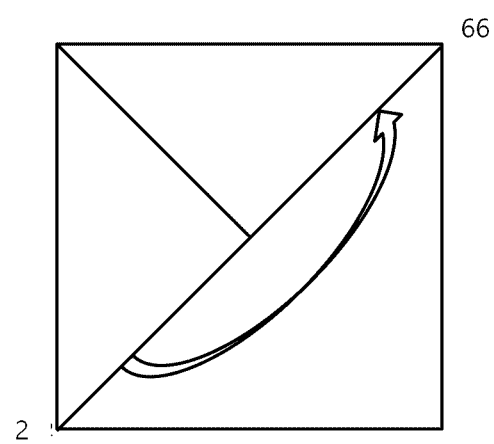
(d) Mode 2 - 1
*FIG. 23*

METHOD AND DEVICE FOR PROCESSING VIDEO SIGNAL USING MPM CONFIGURATION METHOD FOR MULTIPLE REFERENCE LINES

CROSS-REFERENCE TO RELATED APPLICATIONS

This application is a continuation of U.S. application Ser. No. 17/223,419, which was filed on Apr. 6, 2021, and which is a continuation of pending PCT International Application No. PCT/KR2019/013137, which was filed on Oct. 7, 2019, and which claims priority under 35 U.S.C. 119(a) to Korean Patent Application No. 10-2018-0119455 filed with the Korean Intellectual Property Office on Oct. 7, 2018, Korean Patent Application No. 10-2018-0121530 filed with the Korean Intellectual Property Office on Oct. 12, 2018, Korean Patent Application No. 10-2018-0126681 filed with the Korean Intellectual Property Office on Oct. 23, 2018, Korean Patent Application No. 10-2018-0137708 filed with the Korean Intellectual Property Office on Nov. 9, 2018, Korean Patent Application No. 10-2019-0020241 filed with the Korean Intellectual Property Office on Feb. 21, 2019, Korean Patent Application No. 10-2019-0045260 filed with the Korean Intellectual Property Office on Apr. 18, 2019, and Korean Patent Application No. 10-2019-0052222 filed with the Korean Intellectual Property Office on May 3, 2019. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DETAILED DESCRIPTION OF THE INVENTION

Technical Problem

An aspect of the present disclosure is to improve the coding efficiency of a video signal. Specifically, an aspect of the present disclosure is to improve the coding efficiency by using a transform kernel suitable for a transform block.

Technical Solution

In order to solve the above problems, the present disclosure provides a video signal processing device and a video signal processing method as follows.

According to an embodiment of the present disclosure, a method for processing a video signal on the basis of intra prediction includes: obtaining a reference sample line index of a current block from a received bitstream; determining whether the reference sample line index is 0; if the reference sample line index is 0, obtaining information indicating whether the current block uses a planar mode, from the bitstream; determining an intra prediction mode on the basis of the information indicating whether the planar mode is used; and predicting the current block on the basis of the determined intra prediction mode.

In the method for processing a video signal on the basis of intra prediction according to an embodiment of the present disclosure, if the reference sample line index is not 0, the information indicating whether the planar mode is used is not obtained from the bitstream, and if the information indicating whether the planar mode is used is not obtained from the bitstream, the information indicating whether the planar mode is used indicates that the planar mode is not used.

The method for processing a video signal on the basis of intra prediction according to an embodiment of the present disclosure includes: determining whether the current block is included in the top part of a coding tree unit; and if the current block is not included in the top part of the coding tree unit, obtaining the reference sample line index from the bitstream.

The method for processing a video signal on the basis of intra prediction according to an embodiment of the present disclosure includes: determining whether the reference sample line index is 0; if the reference sample line index is 0, obtaining information indicating whether a most probable mode (MPM) is used, from the bitstream; and if the information indicating whether the MPM is used indicates that the MPM is used, and the reference sample line index is 0, obtaining the information indicating whether the planar mode is used, from the bitstream.

The method for processing a video signal on the basis of intra prediction according to an embodiment of the present disclosure includes: determining whether the information indicating whether the planar mode is used indicates that the planar mode is used; if the information indicating whether the planar mode is used indicates that the planar mode is not used, obtaining an MPM index from the bitstream; generating an MPM list including at least one angular mode on the basis of at least one of a previously reconstructed left block or a previously reconstructed upper block of the current block; selecting one intra prediction mode from the MPM list on the basis of the MPM index; and predicting the current block on the basis of the selected intra prediction mode.

According to an embodiment of the present disclosure, a device for processing a video signal on the basis of intra prediction includes a processor and a memory, wherein, based on instructions stored in the memory, the processor: obtains a reference sample line index of a current block from a received bitstream; determines whether the reference sample line index is 0; if the reference sample line index is 0, obtains information indicating whether the current block uses a planar mode, from the bitstream; determines an intra prediction mode on the basis of the information indicating whether the planar mode is used; and predicts the current block on the basis of the determined intra prediction mode.

In the device for processing a video signal on the basis of intra prediction according to an embodiment of the present disclosure: based on the instructions stored in the memory, the processor does not obtain, from the bitstream, the information indicating whether the planar mode is used, if the reference sample line index is not 0; and if the information indicating whether the current block uses the planar mode is not obtained from the bitstream, the information indicating whether the planar mode is used indicates that the planar mode is not used.

In the device for processing a video signal on the basis of intra prediction according to an embodiment of the present disclosure, based on the instructions stored in the memory, the processor: determines whether the current block is included in the top part of a coding tree unit; and if the current block is not included in the top part of the coding tree unit, obtains the reference sample line index from the bitstream.

According to an embodiment of the present disclosure, the device for processing a video signal on the basis of intra prediction: determines whether reference sample line index is 0; if the reference sample line index is 0, obtains information indicating whether a most probable mode (MPM) is used, from the bitstream; and if the information indicating whether the MPM is used indicates that the MPM is used, and the reference sample line index is 0, obtains the information indicating whether the planar mode is used, from the bitstream.

In the device for processing a video signal on the basis of intra prediction according to an embodiment of the present disclosure, based on the instructions stored in the memory, the processor: determines whether the information indicating whether the planar mode is used indicates that the planar mode is used; if the information indicating whether the planar mode is used indicates that the planar mode is not used, obtains an MPM index from the bitstream; generates an MPM list including at least one angular mode on the basis of at least one of a previously reconstructed left block or a previously reconstructed upper block of the current block; selects one intra prediction mode from the MPM list on the basis of the MPM index; and predicts the current block on the basis of the selected intra prediction mode.

According to an embodiment, a method for encoding a video signal on the basis of intra prediction includes: if a current block uses a most probable mode (MPM), and a reference sample line index of the current block is 0, generating information indicating whether the current block uses a planar mode; and generating a bitstream including information indicating whether the planar mode is used.

According to an embodiment, a device for encoding a video signal on the basis of intra prediction includes a processor and a memory, wherein, based on instructions stored in the memory, the processor: if a current block uses a most probable mode (MPM), and a reference sample line index of the current block is 0, generates information indicating whether the current block uses a planar mode; and generates a bitstream including information indicating whether the planar mode is used.

In a device including a video bitstream stored in a non-transitory computer-readable medium, the bitstream is generated based on information indicating whether a current block generated by an encoder uses a planar mode, if the current block uses a most probable mode (MPM), and a reference sample line index of the current block is 0.

According to an embodiment of the present disclosure, a method for processing a video signal on the basis of intra prediction includes: obtaining information indicating whether a current block uses an MPM, from a received bitstream; if at least one of an intra prediction mode of a left block of the current block or an intra prediction mode of an upper block of the current block is the angular mode, generating an MPM list by using only the angular mode; determining the intra prediction mode on the basis of the MPM list; and predicting the current block on the basis of the determined intra prediction mode.

According to an embodiment of the present disclosure, in the method for processing a video signal on the basis of intra prediction, if an intra prediction mode of a left block and an intra prediction mode of an upper block are the same, and the intra prediction mode of the left block is an angular mode, the generating of the MPM list is based on at least one among the intra prediction mode of the left block, an angular mode corresponding to an index smaller than an index of the intra prediction mode of the left block by 1, an angular mode corresponding to an index greater than the index of the intra prediction mode of the left block by 1, an angular mode corresponding to an index smaller than the index of the intra prediction mode of the left block by 2, and an angular mode corresponding to an index greater than the index of the intra prediction mode of the left block by 2.

According to an embodiment of the present disclosure, in the method for processing a video signal on the basis of intra prediction, if the intra prediction mode of the left block and the intra prediction mode of the upper block are not the same, and only one of the intra prediction mode of the left block or the intra prediction mode of the upper block is an angular mode, the generating of the MPM list is based on at least one among: the intra prediction mode of a block, which is an angular mode; an angular mode corresponding to an index smaller than an index of the intra prediction mode of the block, which is the angular mode, by 1; an angular mode corresponding to an index greater than the index of the intra prediction mode of the block, which is the angular mode, by 1; an angular mode corresponding to an index smaller than the index of the intra prediction mode of the block, which is the angular mode, by 2; and an angular mode corresponding to an index greater than the index of the intra prediction mode of the block, which is the angular mode, by 2.

According to an embodiment of the present disclosure, in the method for processing a video signal on the basis of intra prediction, if the intra prediction mode of the left block and the intra prediction mode of the upper block are not the same, and both the intra prediction mode of the left block and the intra prediction mode of the upper block are the angular mode, the generating of the MPM list is based on size comparison between the index of the intra prediction mode of the left block and the index of the intra prediction mode of the upper block.

According to an embodiment of the present disclosure, in the method for processing a video signal on the basis of intra prediction, the generating of the MPM list includes: including the intra prediction mode of the left block and the intra prediction mode of the upper block in the MPM list; and generating the MPM list on the basis of at least one intra prediction mode among an angular mode corresponding to an index greater than the index of the intra prediction mode of the left block by 1, an angular mode corresponding to an index greater than the index of the intra prediction mode of the upper block by 1, an angular mode corresponding to an index smaller than the index of the intra prediction mode of the left block by 1, an angular mode corresponding to an index smaller than the index of the intra prediction mode of the upper block by 1, an angular mode corresponding to an index greater than an index of the intra prediction mode of the left block by 2, an angular mode corresponding to an index greater than an index of the intra prediction mode of the upper block by 2, an angular mode corresponding to an index smaller than an index of the intra prediction mode of the left block by 2, or an angular mode corresponding to an index smaller than the index of the intra prediction mode of the upper block by 2.

According to an embodiment of the present disclosure, in the method for processing a video signal on the basis of intra prediction, if the difference of the index of the intra prediction mode of the left block and the index of the intra prediction mode of the upper block is equal to 1, the generating of the MPM list is based on at least one among: an angular mode corresponding to an index smaller than the smaller of the index of the intra prediction mode of the left block and the index of the intra prediction mode of the upper block by 1; an angular mode corresponding to an index greater than the greater of the index of the intra prediction mode of the left block and the index of the intra prediction mode of the upper block by 1; or an angular mode corresponding to an index smaller than the smaller of the index of the intra prediction mode of the left block and the index of the intra prediction mode of the upper block by 2.

According to an embodiment of the present disclosure, in the method for processing a video signal on the basis of intra prediction, if the difference of the index of the intra prediction mode of the left block and the index of the intra prediction mode of the upper block is equal to or greater than 62, the generating of the MPM list is based on at least one among: an angular mode corresponding to an index smaller than the smaller of the index of the intra prediction mode of the left block and the index of the intra prediction mode of the upper block by 1; an angular mode corresponding to an index greater than the greater of the index of the intra prediction mode of the left block and the index of the intra prediction mode of the upper block by 1; or an angular mode corresponding to an index smaller than the smaller of the index of the intra prediction mode of the left block and the index of the intra prediction mode of the upper block by 2.

According to an embodiment of the present disclosure, in the method for processing a video signal on the basis of intra prediction, if the difference of the index of the intra prediction mode of the left block and the index of the intra prediction mode of the upper block is equal to 2, the generating of the MPM list is based on at least one among: an angular mode corresponding to an index greater than the smaller of the index of the intra prediction mode of the left block and the index of the intra prediction mode of the upper block by 1; an angular mode corresponding to an index smaller than the smaller of the index of the intra prediction mode of the left block and the index of the intra prediction mode of the upper block by 1; or an angular mode corresponding to an index greater than the greater of the index of the intra prediction mode of the left block and the index of the intra prediction mode of the upper block by 1.

According to an embodiment of the present disclosure, in the method for processing a video signal on the basis of intra prediction, if the difference of the index of the intra prediction mode of the left block and the index of the intra prediction mode of the upper block is not equal to 1, if the difference of the index of the intra prediction mode of the left block and the index of the intra prediction mode of the upper block is smaller than 62, and if the difference of the index of the intra prediction mode of the left block and the index of the intra prediction mode of the upper block is not equal to 2, the generating of the MPM list is based on at least one among: an angular mode corresponding to an index smaller than the smaller of the index of the intra prediction mode of the left block and the index of the intra prediction mode of the upper block by 1; an angular mode corresponding to an index greater than the smaller of the index of the intra prediction mode of the left block and the index of the intra prediction mode of the upper block by 1; or an angular mode corresponding to an index smaller than the greater of the index of the intra prediction mode of the left block and the index of the intra prediction mode of the upper block by 1.

According to an embodiment of the present disclosure, in the method for processing a video signal on the basis of intra prediction: an index smaller than an index of an intra prediction mode by 1 is obtained by the following equation: the index smaller than the index of the intra prediction mode by $1=((\text{index of intra prediction mode}+\text{offset})\%(\text{offset}+3))+2$; an index greater than the index of the intra prediction mode by 1 is obtained by the following equation: the index greater than the index of the intra prediction mode by $1=((\text{index of intra prediction mode}-1)\%(\text{offset}+3))+2$; an index smaller than the index of the intra prediction mode by 2 is obtained by the following equation: the index smaller than the index of intra prediction mode by $2=((\text{index of intra prediction mode}+\text{offset}-1)\%(\text{offset}+3))+2$; and an index greater than the index of the intra prediction mode by 2 is obtained by the following equation: the index greater than the index of the intra prediction mode by $2=((\text{index of intra prediction mode})\%(\text{offset}+3))+2$, where the offset is 61.

According to an embodiment of the present disclosure, the method for processing a video signal on the basis of intra prediction includes: obtaining an index of an intra prediction mode of a current block, based on a received bitstream; obtaining a reference sample line index of the current block from the bitstream; and generating a plurality of reference samples and an additional reference sample, based on at least one of the reference sample line index and the index of the intra prediction mode.

According to an embodiment of the present disclosure, in the method for processing a video signal on the basis of intra prediction, the generating of the plurality of reference samples and the additional reference sample includes: if the index of the intra prediction mode is greater than or equal to 34, and an angle of the intra prediction mode mapped to the index of the intra prediction mode is greater than or equal to 0, generating a plurality of first reference samples and a first additional reference sample, based on a previously reconstructed upper block adjacent to the current block; and if the index of the intra prediction mode is smaller than 34, and the angle of the intra prediction mode is greater than or equal to 0, generating a plurality of second reference samples and a second additional reference sample, based on a previously reconstructed left block adjacent to the current block.

According to an embodiment of the present disclosure, in the method for processing a video signal on the basis of intra prediction, the generating of the plurality of first reference samples and the first additional reference sample includes: obtaining the plurality of first reference samples, based on samples corresponding to positions of the plurality of first reference samples among samples included in the previously reconstructed upper block; and obtaining the first additional reference sample by padding a sample at a rightmost position among the plurality of first reference samples, and the generating of the plurality of second reference samples and the second additional reference sample includes: obtaining the plurality of second reference samples, based on samples corresponding to positions of the plurality of second reference samples among samples included in the previously reconstructed left block; and obtaining the second additional reference sample by padding a sample at a lowermost position among the plurality of second reference samples.

According to an embodiment of the present disclosure, in the method for processing a video signal on the basis of intra prediction, the generating of the plurality of reference samples and the additional reference sample includes determining the number of the additional reference samples, based on the reference sample line index or a ratio of a width and a height of the current block.

According to an embodiment of the present disclosure, in the method for processing a video signal on the basis of intra prediction, the number of additional reference samples is obtained by the following equation: the number of additional reference samples=(reference sample line index)×(ratio of width and height of current block)+offset.

According to an embodiment of the present disclosure, in the method for processing a video signal on the basis of intra prediction, offset is 1.

Advantageous Effects

According to an embodiment of the present disclosure, coding efficiency of a video signal can be improved. According to an embodiment of the present disclosure, a current block can be more accurately predicted based on an intra prediction mode.

BRIEF DESCRIPTION OF THE DRAWINGS

FIG. 12 is a diagram illustrating a syntax structure of a coding unit according to an embodiment of the present disclosure.

FIG. 13 is a diagram illustrating a syntax structure representing signaling of an intra prediction mode, by using intra_mode_planar_flag according to an embodiment of the present disclosure.

FIG. 14 is a diagram illustrating a syntax structure representing signaling of the intra prediction mode, by using intra_mode_planar_flag and an ISP mode flag parsing condition according to an embodiment of the present disclosure.

FIG. 15 is a diagram illustrating a syntax structure related to intra prediction mode signaling, by using intra_mode_planar_flag and a reference sample line index condition according to an embodiment of the present disclosure.

FIG. 16 is a diagram illustrating a syntax structure related to MPM signaling according to an embodiment of the present disclosure, wherein the syntax structure is obtained by considering that a reference line index is first parsed/signaled.

FIG. 17 is a diagram illustrating a syntax structure related to MPM signaling according to an embodiment of the present disclosure, wherein the syntax structure is obtained by considering that planar flag is parsed regardless of a reference line index value.

FIG. 18 is a diagram illustrating a syntax structure for signaling/parsing information indicating whether planar flag and MPM are used, according to an embodiment of the present disclosure.

FIG. 19 is a diagram illustrating a syntax structure illustrating signaling/parsing of information indicating whether an MPM and a reference sample line index based on planar flag are used, according to an embodiment of the present disclosure.

FIG. 20 is a diagram illustrating intra_luma_planar_flag in a coding unit syntax structure according to an embodiment of the present disclosure.

FIG. 23 is a diagram illustrating a method of inducing a new MPM by applying offsets, such as +1 and −1, to a most probable mode (MPM) according to an embodiment of the present disclosure.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
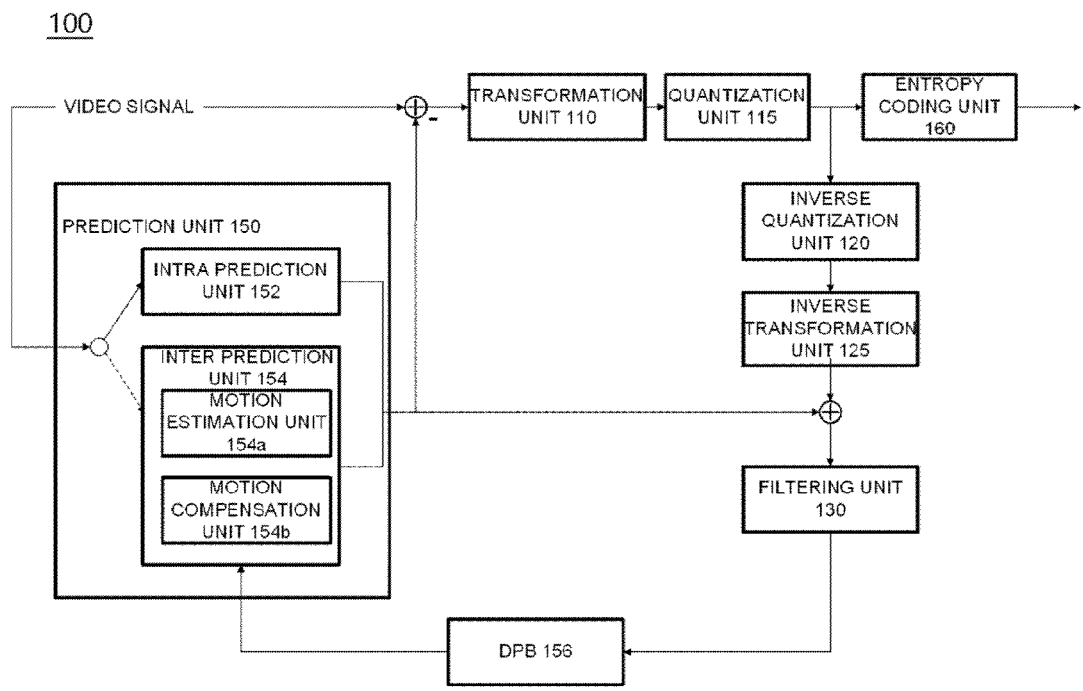
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture, is used. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
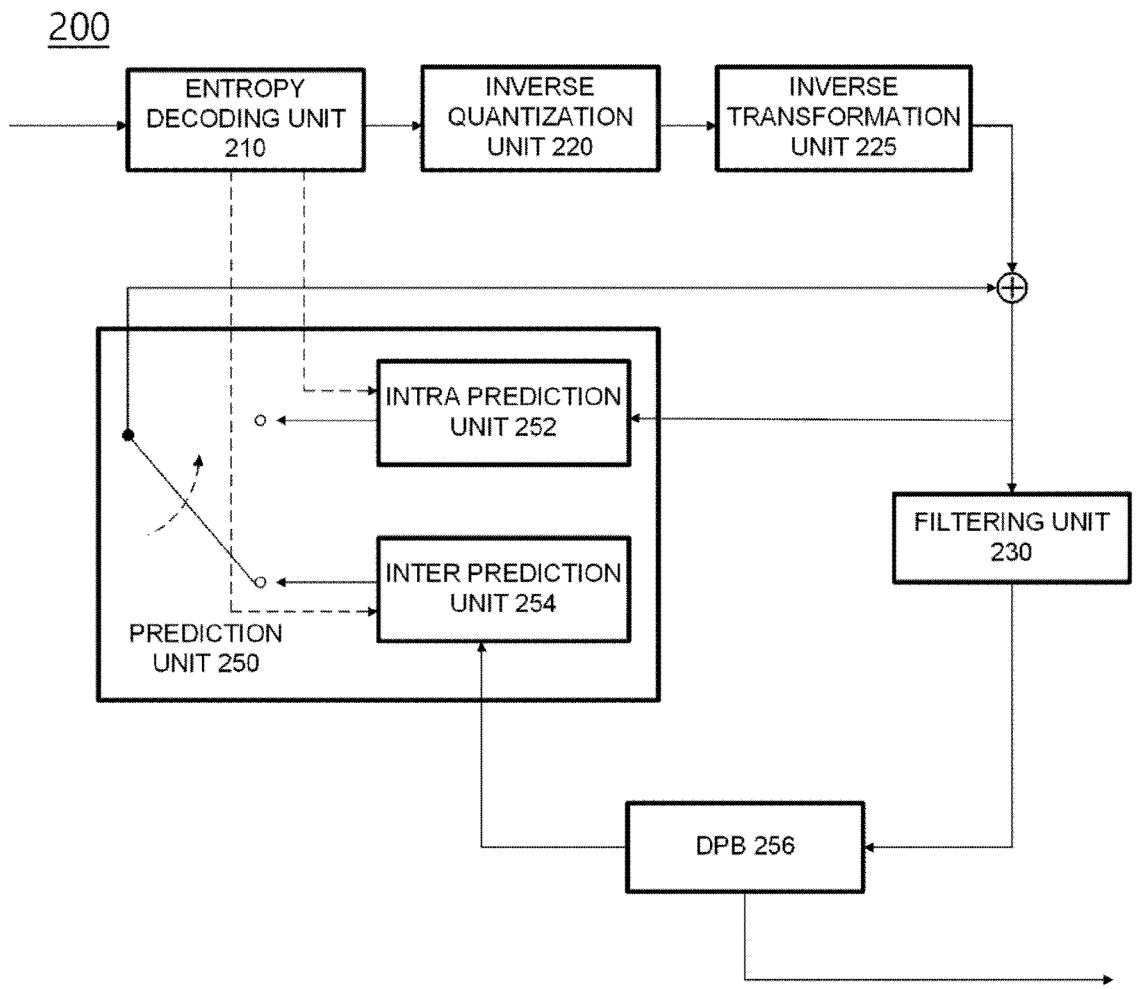
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
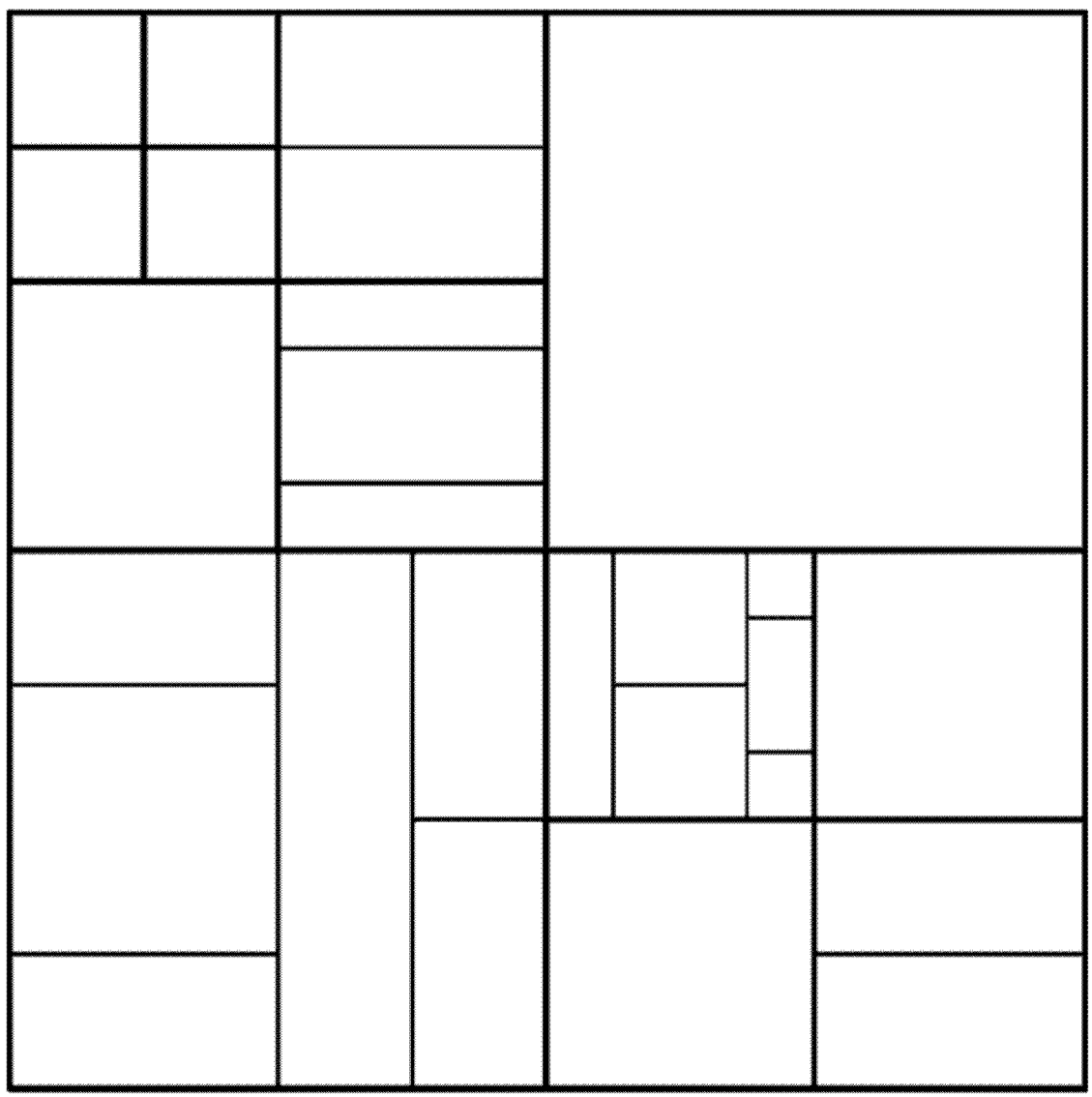
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split may be performed recursively.

The leaf node of the multi-type tree may be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a high level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
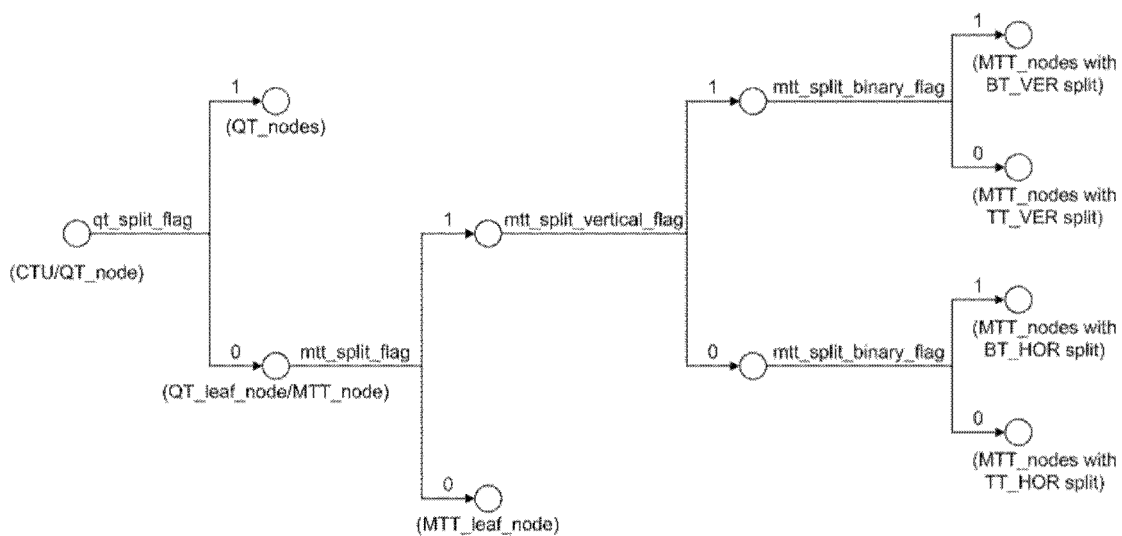
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
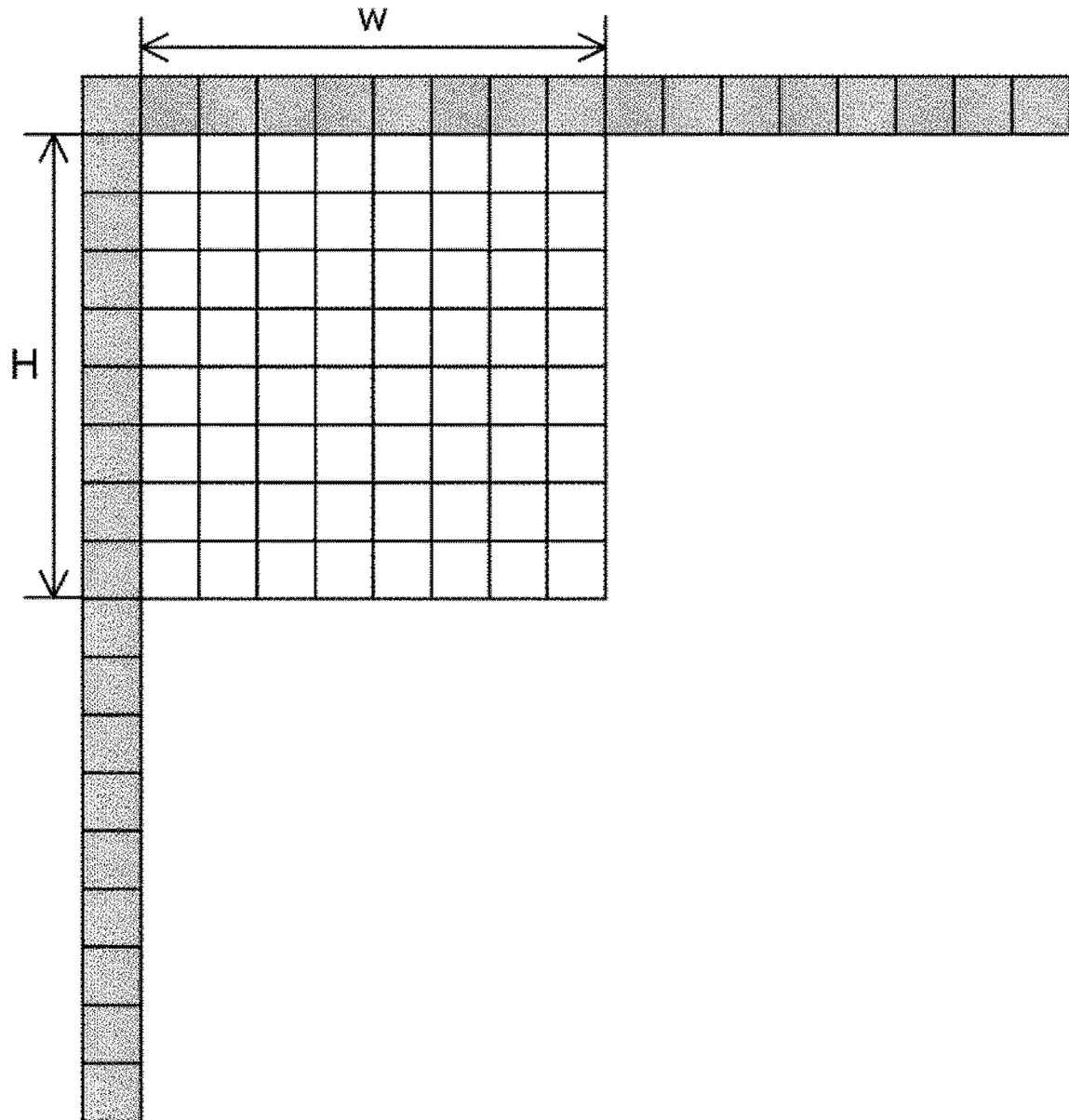
FIGS. 5 and 6 illustrate an intra-prediction method in more detail according to an embodiment of the present disclosure.
Figure 6:
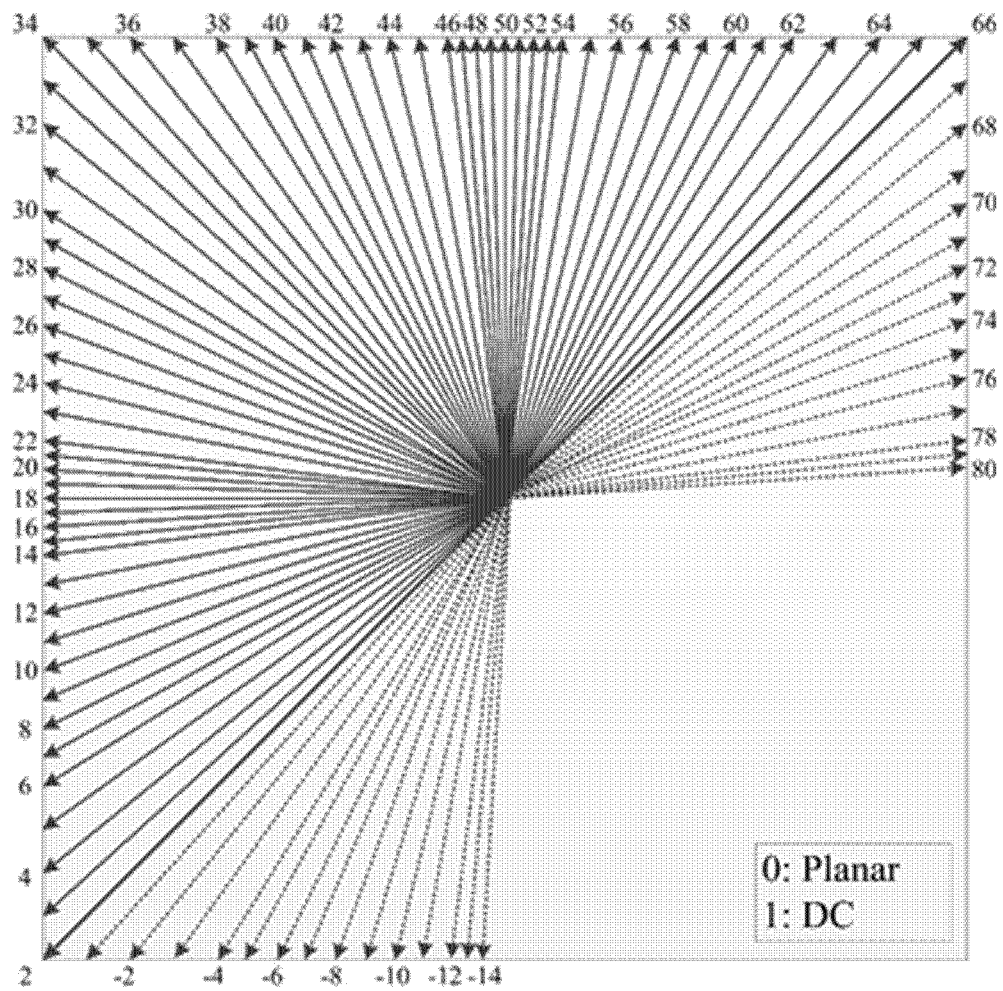

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Hereinafter, an inter prediction method according to an embodiment of the present disclosure will be described with reference to FIG. 7. In the present disclosure, the inter prediction method may include a general inter prediction method optimized for translation motion, and an inter prediction method based on an affine model. A motion vector may include at least one of a general motion vector for motion compensation according to the general inter prediction method and a control point motion vector for affine motion compensation.

Figure 7:
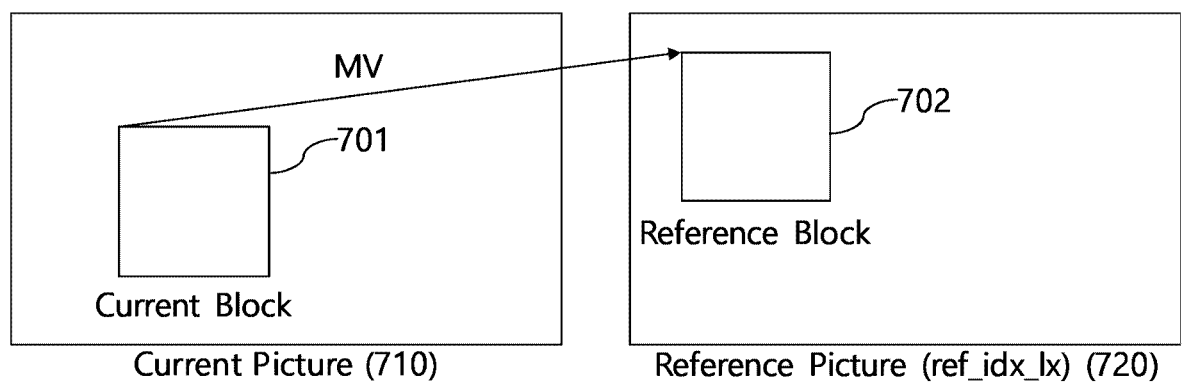
FIG. 7 illustrates an inter prediction method according to an embodiment of the present disclosure.

FIG. 7 illustrates an inter prediction method according to an embodiment of the present disclosure. As described above, a decoder may predict a current block by referring to reconstructed samples of another decoded picture. Referring to FIG. 7, a decoder obtains a reference block 702 in a reference picture 720, based on a motion information set of a current block 701. The motion information set may include a reference picture index and a motion vector 703. The reference picture index indicates the reference picture 720 including the reference block for inter prediction of the current block in a reference picture list. According to an embodiment, the reference picture list may include at least one of the aforementioned L0 picture list and L1 picture list. The motion vector 703 represents an offset between a coordinate value of the current block 701 in the current picture 710 and a coordinate value of the reference block 702 in the reference picture 720. The decoder obtains a predictor of the current block 701 on the basis of sample values of the reference block 702, and reconstructs the current block 701 by using the predictor.

Specifically, an encoder may obtain the aforementioned reference block by searching for a block similar to the current block from pictures having an earlier reconstruction order. For example, the encoder may search for a reference block in which the sum of differences between the current block and the sample values is minimum within a preconfigured search area. In order to measure a similarity between the samples of the current block and the reference block, at least one of a sum of absolute difference (SAD) or a sum of Hadamard transformed difference (SATD) may be used. The SAD may be a value obtained by summing all absolute values of respective differences between the sample values included in the two blocks. The SATD may be a value obtained by adding all absolute values of Hadamard transform coefficients obtained by performing Hadamard transform of the difference between the sample values included in two blocks.

The current block may be predicted using one or more reference areas. As described above, the current block may be inter predicted via a bi-prediction scheme using two or more reference areas. According to an embodiment, the decoder may obtain two reference blocks, based on two motion information sets of the current block. The decoder may obtain a first predictor and a second predictor of the current block, based on sample values of the respective two obtained reference blocks. The decoder may reconstruct the current block by using the first predictor and the second predictor. For example, the decoder may reconstruct the current block, based on an average per sample for the first predictor and the second predictor.

As described above, for motion compensation of the current block, one or more motion information sets may be signaled. Similarity between the motion information sets for motion compensation of each of multiple blocks may be used. For example, the motion information set used for prediction of the current block may be derived from the motion information set used for prediction of one of previously reconstructed other samples. Accordingly, the encoder and decoder may reduce signaling overhead.

For example, there may be a plurality of candidate blocks that may have been predicted based on the same or similar motion information set as the motion information set of the current block. The decoder may generate a merge candidate list on the basis of the plurality of candidate blocks. The merge candidate list may include a candidate corresponding to a sample that may have been predicted based on a motion information set related to the motion information set of the current block, from among samples reconstructed before the current block. The encoder and the decoder may configure a merge candidate list of the current block according to a predefined rule. The merge candidate lists configured by each of the encoder and the decoder may be identical to each other. For example, the encoder and the decoder may configure a merge candidate list of the current block, based on the position of the current block within the current picture. A method of configuring the merge candidate list of the current block by the encoder and the decoder will be described later with reference to FIG. 9. In the present disclosure, a position of a specific block indicates a relative position of a top-left sample of the specific block within a picture including the specific block.

Meanwhile, in order to improve coding efficiency, a method of quantizing a transform coefficient value obtained by transforming a residual signal and coding the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 8:
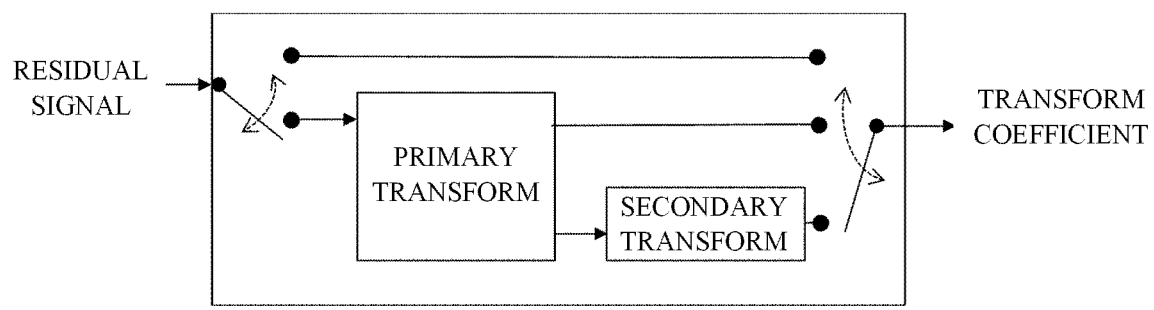
FIG. 8 is a diagram specifically illustrating a method for transforming a residual signal by an encoder.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform secondary transform may be determined depending on the size of the current block or the size of the residual block. Transform kernels having different sizes may be used depending on the size of the current block or the size of the residual block. For example, 8×8 secondary transform may be applied to a block in which a length of a shorter side between a width or a height is shorter than a first preconfigured length. Further, 4×4 secondary transform may be applied to a block in which the length of the shorter side between the width or the height is longer than a second preconfigured length. Here, the first preconfigured length may be a value larger than the second preconfigured length, but the present disclosure is not limited thereto. Unlike primary transform, secondary transform may not be performed separately into vertical transform and horizontal transform. This secondary transform may be referred to as a low frequency band non-separable transform (low frequency non-separable transform, LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

Figure 9:
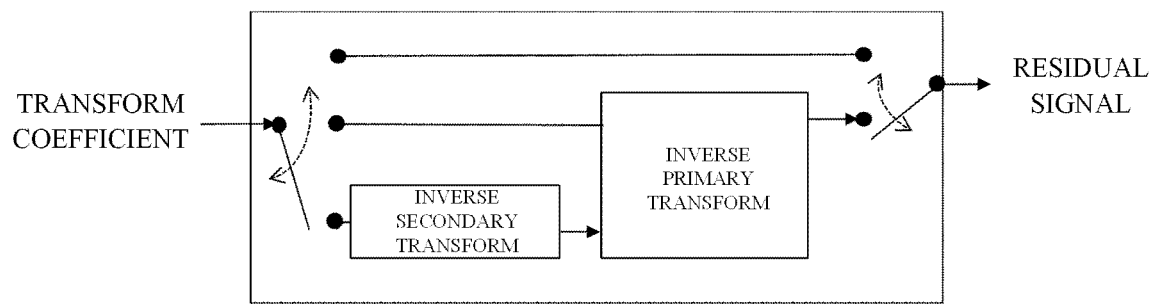
FIG. 9 is a diagram specifically illustrating a method for obtaining a residual signal by inverse transforming a transform coefficient by an encoder and a decoder.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Figure 10:
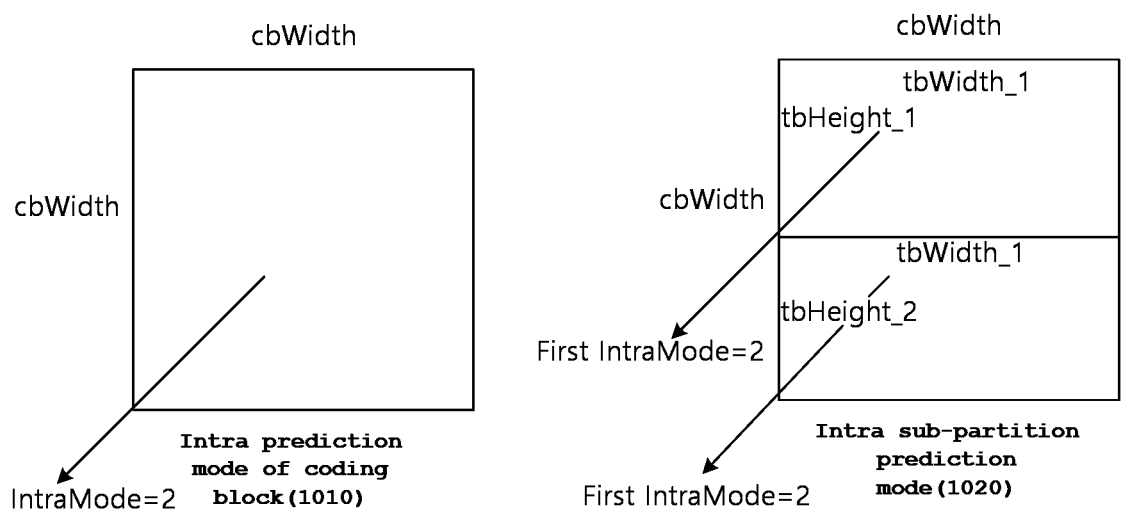
FIG. 10 is a diagram illustrating the concept of an intra sub-partition (ISP) mode according to an embodiment of the present disclosure.

FIG. 10 is a diagram illustrating the concept of an intra sub-partition (ISP) mode according to an embodiment of the present disclosure.

Referring to an intra prediction mode 1010 of a coding block in FIG. 10, the entire coding block may be predicted. However, according to intra sub-partition (ISP), the coding block may be divided into one or more blocks.

For example, referring to an intra sub-partition prediction mode 1020 in FIG. 10, one coding block may be divided into a plurality of transform blocks. Depending on the size of the coding block, there may be 2 or 4 transform blocks. Depending on the coding block, the transform block may be divided in a horizontal direction or a vertical direction. The ISP mode operates only when a reference line index is 0, and the intra prediction mode may be informed only by an MPM index. An MPM list may be configured except for a DC mode. In the present disclosure, an intra-screen prediction mode and an intra prediction mode have the same meaning.

Figure 11:
FIG. 11 is a diagram illustrating an intra (intra-screen) prediction mode for prediction using a plurality of reference sample lines, and a position of a neighboring block for an MPM configuration according to an embodiment of the present disclosure.

FIG. 11 is a diagram illustrating an intra prediction mode for prediction using a plurality of reference sample lines, and a position of a neighboring block for an MPM configuration according to an embodiment of the present disclosure.

In FIG. 11, a drawing 1110 shows a relationship between a current coding block and multiple reference sample lines. In this present disclosure, the current coding block may simply be referred to as a current block. The current coding block may perform intra prediction using one of multiple reference lines. A reference sample line index may be informed using a syntax element of intra_luma_ref_idx[x0][y0]. The syntax element of intra_luma_ref_idx[x0][y0] is applicable only to a luma component, and if the reference sample line index is greater than 0, an intra prediction mode may be indicated by an MPM index.

For example, if the reference sample line index is 0, the current coding block may be intra-predicted using reference line 0. For example, if the reference sample line index is 1, the current coding block may be intra-predicted using reference line 1. For example, if the reference sample line index is 2, the current coding block may be intra-predicted using reference line 2. For example, if the reference sample line index is 3, the current coding block may be intra-predicted using reference line 3.

Reference line 2 may not be used. In this case, if the reference sample line index is 2, the current coding block may be intra-predicted using reference line 3. However, the present disclosure is not limited thereto, and if the reference sample line index is 3, the current coding block may be intra-predicted using reference line 3.

In FIG. 11, a drawing 1120 shows a method of configuring a most probable mode (MPM). The MPM may be configured based on an intra-screen (intra) prediction mode of a neighboring block of the current coding unit. As shown in the drawing, two or more neighboring blocks may be referred to.

The MPM may be configured based on a mode determined according to an intra-screen mode configuration method at positions A and L in the drawing 1120. Position A may be (CbW−1, −1) and position L may be (−1, CbH−1). Here, CbW may be a width of the current coding block, and CbH may be a height of the current coding block. A reference sample line index value as well as whether to apply the ISP mode may be applied, and the configuration method may thus be different. For example, the number of MPM lists is 6, but a different number of MPM lists is also applicable.

For example, if the intra modes of the neighboring blocks of the current block are a PLANAR or a DC mode rather than an angular mode, or have the same mode that is one of the two modes, the MPM list may be configured as follows.

For a first MPM configuration set, if IntraLumaRefLineIdx[xCb][yCb] is equal to 0, and IntraSubPartitionsSplitType is ISP_NO_SPLIT, reference line 0 may be used.

If the ISP mode is not applied, the first MPM configuration set may be configured as follows. IntraLumaRefLineIdx[xCb][yCb] may be an indicator indicating the reference sample line index of the current coding block. IntraSubPartitionsSplitType may be an indicator indicating a split direction of the ISP. ISP_NO_SPLIT may be an indicator indicating that ISP is not applied. candModeList[ ] is a parameter for storing a candidate of the MPM list and has an array value. The intra prediction mode may be divided into an angular mode and a non-angular mode, wherein INTRA_PLANAR and INTRA_DC indicate a case of a non-angular mode. The angular mode maybe displayed in the form of "INTRA_ANGULAR+number". The number may be a number, etc. indicating an order/angle of the angular mode according to a predetermined rule. For example, the angular mode may be displayed as INTRA_ANGULAR50, INTRA_ANGULAR18, INTRA_ANGULAR46, or the like. The pseudocode below shows a process of forming a first MPM configuration set.

If IntraLumaRefLineIdx[xCb][yCb] is equal to 0 and IntraSubPartitionsSplitType is equal to ISP_NO_SPLIT, the following applies:
    candModeList[0]=candIntraPredModeA
    candModeList[1]=(candModeList[0]==INTRA_PLANAR)?INTRA_DC:INTRA_PLANAR
    candModeList[2]=INTRA_ANGULAR50
    candModeList[3]=INTRA_ANGULAR18
    candModeList[4]=INTRA_ANGULAR46
    candModeList[5]=INTRA_ANGULAR54

The following is a second MPM configuration set, in which IntraLumaRefLineIdx[xCb][yCb] is not 0 but may be 1 or 2, and a line index used may be a second or fourth reference sample line. In this case, the ISP mode may not be applied. The second MPM configuration set may be configured as follows.

Otherwise, if IntraLumaRefLineIdx[xCb][yCb] is not equal to 0, the following applies:
    candModeList[0]=INTRA_ANGULAR50
    candModeList[1]=INTRA_ANGULAR18
    candModeList[2]=INTRA_ANGULAR2
    candModeList[3]=INTRA_ANGULAR34
    candModeList[4]=INTRA_ANGULAR66
    candModeList[5]=INTRA_ANGULAR26

The following is a third MPM configuration set which is a case where IntraSubPartitionsSplitType is ISP_HOR_SPLIT, and corresponds to a configuration method used when the ISP mode is applied to the current coding block, and the transform block is divided horizontally. The ISP mode may not be applied if the reference sample line index value is greater than 0. The pseudocode below shows a process of forming the third MPM configuration set.

Otherwise, if IntraSubPartitionsSplitType is equal to ISP_HOR_SPLIT, the following applies:
    candModeList[0]=INTRA_PLANAR
    candModeList[1]=INTRA_ANGULAR18
    candModeList[2]=INTRA_ANGULAR25
    candModeList[3]=INTRA_ANGULAR10
    candModeList[4]=INTRA_ANGULAR65
    candModeList[5]=INTRA_ANGULAR50

The following is a fourth MPM configuration set which is a case where IntraSubPartitionsSplitType is ISP_VER_SPLIT, and corresponds to a configuration method used when the ISP mode is applied to the current coding block, and the transform block is divided vertically. The ISP mode may not be applied if the reference sample line index value is greater than 0. The pseudocode below shows a process of forming the fourth MPM configuration set.

Otherwise, if IntraSubPartitionsSplitType is equal to ISP_VER_SPLIT, the following applies:
    candModeList[0]=INTRA_PLANAR
    candModeList[1]=INTRA_ANGULAR50
    candModeList[2]=INTRA_ANGULAR43 candModeList[3]=INTRA_ANGULAR60
candModeList[4]=INTRA_ANGULAR3
candModeList[5]=INTRA_ANGULAR18

In the present disclosure, a simple MPM configuration method and signaling method are dealt with in consideration of a reference sample line index value, whether ISP is applied, and prediction modes of neighboring blocks L and A.

A description of the MPM configuration method is as follows. The current block is highly likely to have a mode similar to the intra prediction mode of the neighboring block, and the encoder or the decoder may perform MPM configuration based thereon. The MPM configuration may be classified into three cases according to the modes of neighboring blocks L and A.

In a case of a first neighboring block mode, both L and A may be in the PLANAR or the DC mode, rather than in the angular mode.

A 1-1 MPM configuration method may be as follows. Elements may be as follows, and a sequence thereof may be configured differently. For the 1-1 MPM configuration method, an optimized sequence may be used according to a reference sample index, whether ISP is applied, a division direction mode of the ISP, and the like.
candModeList[0]=INTRA_ANGULAR50
candModeList[1]=INTRA_ANGULAR18
candModeList[2]=INTRA_ANGULAR3
candModeList[3]=INTRA_ANGULAR65
candModeList[4]=INTRA_ANGULAR34
candModeList[5]=INTRA_ANGULAR25

A 1-2 MPM configuration method may be as follows. Elements may be as follows, and a sequence thereof may be configured differently. For the 1-2 MPM configuration method, an optimized sequence may be used according to a reference sample index, whether ISP is applied, a division direction mode of the ISP, and the like.
candModeList[0]=INTRA_ANGULAR50
candModeList[1]=INTRA_ANGULAR18
candModeList[2]=INTRA_ANGULAR2
candModeList[3]=INTRA_ANGULAR66
candModeList[4]=INTRA_ANGULAR34
candModeList[5]=INTRA_ANGULAR25

A 1-3 MPM configuration method may be configured by a combination in which INTRA_ANGULAR34 is changed to DC_IDX in the 1-1 MPM configuration method. A configuration sequence of the 1-3 MPM configuration method may be configured differently. For the 1-3 MPM configuration method, an optimized sequence may be used according to a reference sample index, whether ISP is applied, a division direction mode of the ISP, and the like.

A 1-4 MPM configuration method may be a combination in which INTRA_ANGULAR34 is changed to DC_IDX in the 1-2 MPM configuration method. A configuration sequence of the 1-4 MPM configuration method may be configured differently. For the 1-4 MPM configuration method, an optimized sequence may be used according to a reference sample index, whether ISP is applied, a division direction mode of the ISP, and the like.

In a case of a second neighboring block mode, at least one of L and A may be in the DC mode, and the other may be in the angular mode.

A 2-1 MPM configuration method may be as follows, and a sequence thereof may be configured differently. maxAB indicates a larger index value in the intra prediction modes of neighboring blocks L and A. In this case, one angular mode and one DC mode are used, and the angular mode index has a value greater than a DC mode index value.

Multiple candidates may be created as in the example below, by applying an offset value to a mode index determined by maxAB. In the following, generation of four additional modes is given as an example. Examples, in which −1, +1, −2, and +2 are applied as offset values, are provided, but the present disclosure is not limited thereto. For example, the offset values may be −1, +1, −3, +3, or may be −2, +2, −3, +3.
candModeList[0]=maxAB
candModeList[1]=DC_IDX
candModeList[2]=2+((maxAB+61)%64)//−1
candModeList[3]=2+((maxAB−1)%64)//+1
candModeList[4]=2+((maxAB+60)%64)//−2
candModeList[5]=2+((maxAB)%64)//+2

In a case of a third neighboring block mode, both L and A may be in the angular mode. The angular modes of L and A may be the same angular mode or may be different angular modes.

A 3-1 MPM configuration method may be as follows, and a sequence thereof may be configured differently. maxAB indicates a larger index value in the intra prediction modes of neighboring blocks L and A. minAB indicates a small index value in the intra prediction modes of neighboring blocks L and A. Since the modes of neighboring blocks L and A mode are the angular mode, if a new mode is generated by applying an offset value, neighboring blocks L and A may be in an identical mode, and therefore the offset value may be configured differently by distinguishing a case, in which a difference value of maxAB−minAB is within a specific value, from a case of otherwise. In the example below, if the difference between the two modes is between 3 and 61, the offset value is configured to −1, +1, and −2, and otherwise, the offset value is configured to −3, +3, and −4. Sections for configuring a range of a difference value between modes and an offset value are not limited to the above examples. A parameter of leftIntraDir may indicate an intra prediction mode of left neighboring block L. A parameter of aboveIntraDir may indicate an intra prediction mode of upper neighboring block A.
candModeList[0]=leftIntraDir
candModeList[1]=aboveIntraDir
candModeList[2]=DC_IDX
If maxAB-minAB is in the range of 3 to 61
candModeList[3]=2+((maxAB+61)%64)//−1: offset
candModeList[4]=2+((maxAB−1)%64)//+1: offset
candModeList[5]=2+((maxAB+60)%64)//−2: offset
Else
candModeList[3]=2+((maxAB+59)%64)//−3: offset
candModeList[4]=2+((maxAB+1)%64)//+3: offset
candModeList[5]=2+((maxAB+58)%64)//−4: offset FIG. 12 is a diagram illustrating a syntax structure of a coding unit according to an embodiment of the present disclosure.

If a CuPredMode[x0][y0] value of a current coding unit (x0, y0) is MODE_INTRA, and treeType is SINGLE_TREE OR DUAL_TREE_LUMA, the decoder may obtain information of intra_luma_ref_idx[x0][y0], intra_subpartitions_mode_flag[x0][y0], intra_subpartitions_split_flag[x0][y0], intra_luma_mpm_flag[x0][y0], intra_luma_mpm_idx[x0][y0] or intra_luma_mpm_remainder[x0][y0] from a bitstream, or may use a value inferred according to a preconfigured method. The CuPredMode[x0][y0] value may indicate an intra, inter, or intra block copy mode, and treeType may indicate whether luma and chroma are divided into the same structure. intra_luma_ref_idx[x0][y0] may indicate a reference sample line. intra_subpartitions_mode_flag[x0][y0] may indicate whether a mode is predicted via division of the coding unit into multiple transform blocks. intra_subpartitions_split_flag[x0][y0] may indicate whether a division direction is horizontal or vertical when the coding unit is divided into multiple transform blocks and predicted. intra_luma_mpm_flag[x0][y0] may indicate indicating whether an MPM list is used as a mode signaling method of the coding unit. intra_luma_mpm_idx[x0][y0] may be an indicator indicating the number in the mpm list. intra_luma_mpm_remainder[x0][y0] may indicate index values in the remaining modes except for MPM list modes.

Each syntax element may be transformed/coded using different binary coding methods. For example, the syntax element may be encoded by a context-adaptive arithmetic entropy-coded syntax element (ae(v)) or a fixed-pattern bit string (f(n)).

FIG. 13 is a diagram illustrating a syntax structure representing signaling of an intra prediction mode, by using intra_mode_planar_flag according to an embodiment of the present disclosure.

FIG. 13 is a syntax structure using intra_mode_planar_flag[x0][y0]. intra_mode_planar_flag[x0][y0] is information indicating whether an intra prediction mode of a current coding unit (current block) is a planar mode. If intra_mode_planar_flag[x0][y0] is 1, this may indicate that the planar mode is used. If intra_mode_planar_flag[x0][y0] is 0, this may indicate that the planar mode is not used. The decoder may obtain intra_mode_planar_flag[x0][y0] from a bitstream.

If information (intra_mode_planar_flag[x0][y0]) indicating whether the planar mode is used is equal to 0, and satisfies (y0%CtbSizeY)>0, the decoder may parse intra_luma_ref_idx[x0][y0]. If the information (intra_mode_planar_flag[x0][y0]) indicating whether the planar mode is used is 1, the decoder may infer that the reference sample line index is 0, and if the reference sample line index is greater than 0, the planar mode may not be used. The line index being greater than 0 may indicate that the line index is not 0.

If the reference sample line index is not 0, the decoder does not use the planar mode, and therefore the decoder may not obtain, from the bitstream, the information indicating whether the planar mode is used. If information indicating whether the current block uses the planar mode is not obtained from the bitstream, the information indicating whether the planar mode is used may indicate that the planar mode is not used. The decoder may configure information, which indicates whether the planar mode is used, so that the planar mode is not used. The decoder and the encoder do not separately transmit or receive the information indicating whether the planar mode is used, and decoding and encoding efficiency may thus be improved.

The decoder may parse two ISP-related flags (intra_subpartitions_mode_flag[x0][y0], and intra_subpartitions_split_flag[x0][y0]). intra_luma_mpm_flag[x0][y0] may be parsed if all the following conditions (intra_luma_ref_idx[x0][y0]==0&&intra_subpartitions_mode)flag[x0][y0]==0&&intra_mode_Planar_flag[x0][y0]==0) are satisfied. If the conditions are not satisfied, intra_luma_mpm_flag[x0][y0] may be inferred. The decoder may determine whether to parse intra_luma_mpm_idx[x0][y0] according to a value of intra_luma_mpm_flag[x0][y0].

FIG. 14 is a diagram illustrating a syntax structure representing signaling of the intra prediction mode, by using intra_mode_planar_flag and an ISP mode flag parsing condition according to an embodiment of the present disclosure.

FIG. 14 is a syntax structure considering a case in which a planar mode and a DC mode are not used in an ISP mode and intra_mode_planar_flag[x0][y0]. If the PLANAR and the DC mode are not used in the ISP mode, and intra_mode_planar_flag[x0][y0] is thus true, the decoder may infer a value of intra_subpartitions_mode_flag[x0][y0] to be 0. The decoder may parse intra_subpartitions_mode_flag[x0][y0] if the following conditions are satisfied.

(intra_luma_ref_idx[x0][y0]==0&&
    (cbWidth<=MaxTbSizeY||cbHeight<=MaxTbSizeY)&&
    (cbWidth*cbHeight>MinTbSizeY*MinTbSizeY)
    &&Intra_mode_Planar_flag[x0][y0]==0)

The decoder may parse intra_luma_mpm_flag[x0][y0] under the following conditions.

(intra_luma_ref_idx[x0][y0]==0&&intra_subpartitions_mode_flag[x0][y0]==0&&intra_mode_Planar_flag[x0][y0]==0) or ((intra_luma_ref_idx[x0][y0]==0&&intra_subpartitions_mode_flag[x0][y0]==0)||intra_mode_Planar_flag[x0][y0]==0) or (intra_luma_ref_idx[x0][y0]==0&&intra_subpartitions_mode_flag[x0][y0]==0)

If both the planar mode and the DC mode are not used in the ISP mode, a new angular mode may be configured excluding the planar mode in MPM configuration methods used in a previously defined ISP mode. Alternatively, a new angular mode may be added and configured excluding the planar mode in the MPM configuration methods proposed in the present disclosure. The decoder may fill the MPM list with only the angular mode. Descriptions provided in FIG. 13 or 14 may also be applied to FIG. 15 and FIG. 16.

FIG. 15 is a diagram illustrating a syntax structure related to intra prediction mode signaling, by using intra_mode_planar_flag and a reference sample line index condition according to an embodiment of the present disclosure.

Descriptions having already been provided in FIG. 12 and FIG. 13 will be omitted. FIG. 15 may be a syntax structure considering a case in which a DC mode is not used in an ISP mode and intra_mode_planar_flag[x0][y0].

The decoder may obtain a reference sample line index (intra_luma_ref_idx[x0][y0]) of a current block from a received bitstream. The decoder may determine (intra_luma_ref_idx[x0][y0]==0) whether the reference sample line index (intra_luma_ref_idx[x0][y0]) is 0. The decoder may parse information (intra_mode_Planar_flag[x0][y0]) indicating whether to the planar mode is used only when the reference sample line index is 0. Parsing may refer to the decoder obtaining information from the received bitstream.

If the reference sample line index is not 0, the planar mode may not be used. Therefore, if the reference sample line index is not 0, the bitstream may not include information indicating whether the planar mode is used. If the reference sample line index is not 0, the decoder may configure the information, which indicates whether the planar mode is used, so that the planar mode is not used.

The decoder may determine an intra prediction mode, based on the information indicating whether the planar mode is used. The intra prediction mode may be one of the planar mode, the DC mode, or the angular mode. The decoder may predict the current block, based on the determined intra prediction mode. The information indicating whether the planar mode is used may indicate that "the planar mode is used" or "the planar mode is not used". If the information indicating whether the planar mode is used indicates that the planar mode is used, the decoder may predict the current block on the basis of the planar mode. If the information indicating whether the planar mode is used indicates that the planar mode is not used, the decoder may predict the current block on the basis of the prediction mode rather than the planar mode.

intra_luma_mpm_flag[x0][y0] may be parsed under the following conditions. (intra_luma_ref_idx[x0][y0]==0&&intra_subpartitions_mode_flag[x0][y0]==0&&intra_mode_Planar_flag[x0][y0]==0). That is, if intra_mode_Planar_flag[x0][y0]==0, the decoder may parse intra_luma_mpm_flag[x0][y0].

In the above, it has been described that information indicating whether the most probable mode (MPM) is used is obtained based on the information indicating whether the planar mode is used, but the present disclosure is not limited thereto. The decoder may obtain, from the received bitstream, the information indicating whether the most probable mode (MPM) is used, based on a predetermined condition. If it is determined that the information (intra_luma_mpm_flag[x0][y0]) indicating whether the MPM is used indicates that the MPM is used, the decoder may parse the information indicating whether the planar mode is used. If the decoder determines that the information (intra_luma_mpm_flag[x0][y0]) indicating whether the MPM is used indicates that the MPM is not used, the decoder may not obtain, from the bitstream, the information indicating whether the planar mode is used, and may configure the information indicating whether the planar mode is used, so that the planar mode is not used. Descriptions overlapping with those of FIG. 13 or FIG. 14 will be omitted.

The intra mode of the first neighboring block may use the MPM configuration method defined as described above, and the intra mode of the second neighboring block and the intra mode of the third neighboring block may operate according to the 2-1 MPM configuration method and the 3-1 MPM configuration method. For example, in the content described in FIG. 11, the intra mode of the first neighboring block may use from the defined first MPM configuration set to the defined fourth MPM configuration set, and the 2-1 MPM configuration method and the 3-1 MPM configuration method may be used for the intra mode of the second neighboring block and the intra mode of the third neighboring block.

As for the intra mode of the first neighboring block, only "a case where the reference sample line index is 0, and the ISP mode is not used" and "a case where the reference sample line index is not 0, and the ISP mode is not used" may be considered. The intra mode of the second neighboring block and the intra mode of the third neighboring block may operate according to the 2-1 MPM configuration method and the 3-1 MPM configuration method. For example, as described in FIG. 11, the intra mode of the first neighboring block may be divided into the above two cases so as to configure the MPM, and the intra mode of the second neighboring block and the intra mode of the third neighboring block may operate according to the 2-1 MPM configuration method and the 3-1 MPM configuration method.

The decoder may use the first MPM configuration method described in FIG. 11, if the reference sample line index is 0, and the ISP mode is not used. If the reference sample line index is greater than 0, and if the reference sample line index is 0, and ISP mode is used, the decoder may use one of the 1-1 MPM configuration method, the 1-2 MPM configuration method, the 1-3 MPM configuration method, and the 1-4 MPM configuration method described in FIG. 8.

Although the above descriptions have been provided in terms of the decoder, the descriptions may be applied to the encoder in the same manner.

FIG. 16 is a diagram illustrating a syntax structure related to MPM signaling according to an embodiment of the present disclosure, wherein the syntax structure is obtained by considering that a reference line index is first parsed/signaled.

In FIG. 16, in a case of a general intra prediction mode in which pcm_flag[x0][y0] is 0, and CUPredMode[x0][y0] is MODE_INTRA, the decoder may determine whether y0%CtbSizeY>0 is true. y0%CtbSizeY>0 may represent determining of whether a current block is included in the top part of a coding tree unit. y0 is a y-axis coordinate of an upper left pixel of the current block. CtbSizeY may represent a size of the coding tree unit. Further, (y0%CtbSizeY>0==1) may refer to a case in which the current block is not included in the top part of the coding tree unit.

If the current block is not included in the top part of the coding tree unit, the decoder may parse a reference sample line index (intra_luma_ref_idx[x0][y0]). Parsing refers to obtaining a syntax element from a received bitstream.

If the reference sample line index is 0, information (intra_mode_Planar_flag[x0][y0]) indicating whether the planar mode is used is parsed to determine whether 0 or 1 is indicated, and if 1 is indicated, the intra prediction mode becomes the planar mode. Alternatively, if 0 is indicated, information (intra_luma_mpm_flag[x0][y0]), indicating whether the MPM is used is parsed, and then the intra prediction mode may be obtained/determined based on intra_luma_mpm_idx[x0][y0] or intra_luma_mpm_remainder[x0][y0] information.

When the reference sample line index (Intra_luma_ref_idx[x0][y0]) is signaled/obtained first, the decoder may determine whether the reference sample line index (Intra_luma_ref_idx[x0][y0]) is 0. If the reference sample line index indicates a value greater than 0, the reference sample line of the current block may not be a nearest reference sample line, and therefore the planar mode may not be used. In this case, the decoder may infer, to 0, information indicating whether the planar mode is used, and a value indicated by the information may be thus known without obtaining the information by signaling and parsing. This enables prediction mode information to be signaled/obtained based on parameters of an MPM method or a method other than MPM, instead of the planar mode.

In an embodiment of the present disclosure, the encoder or the decoder may use information indicating whether the MPM is used. If the reference sample line index (Intra_luma_ref_idx[x0][y0]) is 0, the encoder may generate information indicating whether the MPM is used, as a bitstream. If the reference sample line index (Intra_luma_ref_idx[x0][y0]) is 0, the decoder may obtain the information indicating whether the MPM is used, from the bitstream.

If the information indicating whether the MPM is used indicates that the MPM is used, and the reference sample line index is 0, the decoder may obtain information indicating whether the planar mode is used, from the bitstream. If the information indicating whether the MPM is used indicates that the MPM is not used or the reference sample line index is not 0, the decoder may not obtain information indicating whether the planar mode is used, from the bitstream. If the information indicating whether the planar mode is used is not obtained from the bitstream, the information indicating whether the planar mode is used may indicate that the planar mode is not used.

The decoder may parse information (intra_mode_Planar_flag[x0][y0]) indicating whether the planar mode is used, and then may parse intra_subpartitions_mode_flag[x0][y0], intra_mode_Planar_flag[x0][y0], and intra_suppartitions_split_flag[x0][y0]. The information (Intra_luma_mpm_flag[x0][y0]) indicating whether the MPM is used may be parsed based on intra_luma_ref_idx[x0][y0], intra_subpartitions_mode_flag[x0][y0], and intra_luma_Planar_flag[x0][y0]. For example, if intra_luma_ref_idx[x0][y0] indicates that a 0th reference sample line is used, if intra_subpartitions_mode_flag[x0][y0] indicates that the ISP mode is not used, and if intra_luma_Planar_flag[x0][y0] indicates that a mode is not the planar mode, the information (intra_luma_mpm_flag[x0][y0]) indicating whether the MPM is used may be parsed. If intra_luma_Planar_flag[x0][y0] indicates 0, and intra_luma_ref_idx[x0][y0] indicates a value greater than 0, the information (intra_luma_mpm_flag[x0][y0]) indicating whether the MPM is used may be inferred to 1. If intra_luma_Planar_flag[x0][y0] indicates 0, if intra_luma_ref_idx[x0][y0] indicates 0, and if intra_supartitions_mode_flag[x0][y0] indicates 1, the information (intra_luma_mpm_flag[x0][y0]) indicating whether the MPM is used may be inferred to 1.

If intra_supartitions_mode_flag[x0][y0] indicates 1, this may represent that the ISP mode has been applied. Alternatively, if intra_luma_Planar_flag[x0][y0] indicates 0, and intra_supartitions_mode_flag[x0][y0] indicates 1, the information (intra_luma_mpm_flag[x0][y0]) indicating whether the MPM is used may be inferred to 1. The ISP mode corresponds to a case in which the reference sample line index is 0, and is applicable only when a reference sample line closest to the current prediction block is used, so that an indicator, such as information indicating whether the planar mode is used, may be omitted. Even when applied to all reference sample line indices, the indicator, such as information indicating whether the planar mode is used, may be omitted. A method of inferring an mpm flag may be commonly applied to the syntax structure of FIG. 13 to FIG. 17 in which a planar flag is signaled/parsed first, and then information indicating whether the MPM is used follows. This content may be described separately in semantics.

CUPredMode[x0][y0] indicates a prediction mode, and may indicate Intra, Intra, and IBC. intra_luma_ref_idx[x0][y0] indicates the reference sample line index and may be 0, 1, or 2, which may refer to a 0th, 1st, and 3rd neighboring reference sample line of the current prediction block. intra_mode_Planar_flag[x0][y0] may be information indicating whether the planar mode is used. intra_luma_mpm_flag[x0][y0] may be information indicating whether the MPM is used or may be a parameter indicating whether the intra-screen (intra) prediction mode is included in the most probable mode (MPM) list. intra_subpartitions_mode_flag[x0][y0] may be a parameter indicating whether the ISP mode is used. intra_suppartitions_split_flag[x0][y0] may be a parameter indicating a split mode corresponding to a vertical/horizontal direction when the ISP mode is used. intra_luma_mpm_idx[x0][y0] may be a parameter indicating a position within the MPM list. intra_luma_mpm_remainder[x0][y0] may be a parameter indicating one of intra prediction modes that are not included in the MPM list. When the same parameter names are used throughout the present disclosure, this may generally be interpreted to have the same meaning.

FIG. 17 is a diagram illustrating a syntax structure related to MPM signaling according to an embodiment of the present disclosure, wherein the syntax structure is obtained by considering that planar flag is parsed regardless of a reference line index value.

In FIG. 17, in a case of a general intra prediction mode in which pcm_[x0][y0] is 0, and CUPredMode[x0][y0] is MODE_INTRA, intra_luma_ref_idx[x0][y0] and intra_mode_Planar_flag[x0][y0] may be parsed. intra_mode_Planar_flag may be signaled separately from an intra_luma_ref_idx value. This may represent that the planar mode may be used even when a value indicated by intra_luma_ref_idx is not a reference sample line closest to a current prediction block. It is determined whether a value indicated by intra_mode_Planar_flag[x0][y0] is 0 or 1, and if the value is 1, the intra prediction mode becomes the planar mode. If the value is 0, intra_luma_mpm_flag[x0][y0] is parsed, then an intra prediction mode may be obtained/determined based on intra_luma_mpm_idx[x0][y0] or intra_luma_mpm_remainder[x0][y0] information. After intra_mode_Planar_flag[x0][y0] is parsed, intra_subpartitions_mode_flag[x0][y0], intra_mode_Planar_flag[x0][y0], and intra_suppartitions_flag[x0][y0] may be parsed. intra_luma_mpm_flag[x0][y0] may be parsed based on intra_luma_ref_idx[x0][y0], intra_subpartitions_mode_flag[x0][y0], and intra_luma_Planar_flag[x0][y0]. For example, if intra_luma_ref_idx[x0][y0] indicates that the 0th reference sample line is used, if intra_subpartitions_mode_flag[x0][y0] indicates that the ISP mode is not used, and if intra_luma_Planar_flag[x0][y0] indicates that a mode is not the planar mode, intra_luma_mpm_flag[x0][y0] may be parsed.

FIG. 18 is a diagram illustrating a syntax structure for signaling/parsing information indicating whether Planar flag and MPM are used, according to an embodiment of the present disclosure.

In FIG. 18, in a case of a general intra prediction mode in which pcm_flag[x0][y0] is 0, and CUPredMode[x0][y0] is MODE_INTRA, the decoder may parse a reference sample line index (intra_luma_ref_idx[x0][y0]), and if the reference sample line index indicates 0, the decoder may parse information (intra_mode_Planar_flag[x0][y0]) indicating whether the planar mode is used. It is determined whether a value indicated by information (Intra_mode_Planar_flag[x0][y0]) indicating whether the planar mode is used is 0 or 1, and if the value is 1, the intra prediction mode becomes the planar mode. If the value is 0, information (intra_luma_mpm_flag[x0][y0]), indicating whether the MPM is used is parsed, and then the intra prediction mode may be obtained/determined based on intra_luma_mpm_idx[x0][y0] or intra_luma_mpm_remainder[x0][y0] information.

For example, if the information (intra_luma_mpm_flag[x0][y0]) indicating whether the MPM is used indicates that the MPM is not used, the decoder may obtain, from the bitstream, an index (intra_luma_mpm_remainder[x0][y0]) indicating the intra prediction mode. The decoder may predict the current block by performing intra prediction based on the index indicating the intra prediction mode. The decoder may select one intra mode, based on intra_luma_mpm_remainder[x0][y0] among intra modes excluding an intra mode used for the MPM. The decoder may predict the current block, based on the selected intra mode.

After intra_mode_Planar_flag[x0][y0] is parsed, intra_subpartitions_mode_flag[x0][y0] and intra_suppartitions_split_flag[x0][y0] may be parsed. Intra_luma_mpm_flag[x0][y0] may be parsed based on an intra_luma_Planar_flag[x0][y0] value. For example, if intra_luma_Planar_flag[x0][y0] indicates that a mode is not the planar mode, intra_luma_mpm_flag[x0][y0] may be parsed. In a case where the reference sample index is not 0, and in a case where the ISP mode is used, instead of inferring to a value of 1 for information indicating whether the MPM is used, if a planar flag indicates 0 even for each case so as to indicate that a mode is not the planar mode, the information indicating whether the MPM is used may be signaled/parsed.

In an embodiment of the present disclosure, information indicating whether the MPM is used in the MPM method may be included. If the reference sample line index (Intra_luma_ref_idx[x0][y0]) is 0, the decoder may obtain the information indicating whether the MPM is used, from the bitstream. If the reference sample line index (Intra_luma_ref_idx[x0][y0]) is 0, the encoder may not generate information indicating whether the MPM is used, as a bitstream. The decoder may predict the current block by performing intra prediction based on the information indicating whether the MPM is used. The decoder and the encoder may increase efficiency of decoding and encoding, by omitting information indicating whether the planar mode is used.

FIG. 19 is a diagram illustrating a syntax structure illustrating signaling/parsing of information indicating whether an MPM and a reference sample line index based on planar flag are used, according to an embodiment of the present disclosure.

In FIG. 19, in a case of a general intra prediction mode in which pcm_flag[x0][y0] is 0, and CUPredMode[x0][y0] is MODE_INTRA, intra_mode_Planar_flag[x0][y0] may be parsed, and if a value thereof indicates 0, intra_luma_ref_idx [x0][y0] may be parsed. If intra_mode_Planar_flag[x0][y0] indicates 1, intra_luma_ref_idx[x0][y0] may be inferred to 0, and therefore separate signaling/parsing may not be required. It is determined whether a value indicated by Intra_mode_Planar_flag[x0][y0] is 0 or 1, and if the value is 1, the intra prediction mode becomes the planar mode. If the value is 0, intra_luma_mpm_flag[x0][y0] is parsed, then the intra prediction mode may be obtained/determined based on intra_luma_mpm_idx[x0][y0] or intra_luma_mpm_remainder[x0][y0] information. After intra_mode_Planar_flag[x0][y0] is parsed, intra_subpartitions_mode_flag[x0][y0] and intra_suppartitions_split_flag[x0][y0] may be parsed. Intra_luma_mpm_flag[x0][y0] may be parsed based on an intra_luma_Planar_flag[x0][y0] value. For example, if intra_luma_Planar_flag[x0][y0] indicates that a mode is not the planar mode, intra_luma_mpm_flag[x0][y0] may be parsed. In a case where the reference sample index is not 0, and in a case where the ISP mode is used, instead of inferring to a value of 1 for information indicating whether the MPM is used, if a planar flag indicates 0 even for each case so as to indicate that a mode is not the planar mode, the information indicating whether the MPM is used may be signaled/parsed.

In the proposed methods, a method for configuring the MPM list may include configuring the MPM list in the same manner in all of an MRL situation, an ISP situation, and a general situation, to which the MRL and the ISP are not applied, wherein the MPM list may be configured by a preconfigured number of MPM lists. The preconfigured number of MPM configurations may be six. However, the number of preconfigured MPM configurations is not limited to six. In the MPM list configured in this way, only the planar mode may be signaled via a separate flag, and may be inferred to 0 by an intra_luma_ref_idx value. MPM lists other than the planar mode may be signaled via intra_luma_mpm_flag and intra_luma_mpm_idx. Positions, on a syntax structure, of Intra_mode_Planar_flag and two ISP-related flags may independently include information and may be obtained without dependence on each other.

FIG. 20 is a diagram illustrating intra_luma_planar_flag in a coding unit syntax structure according to an embodiment of the present disclosure.

The syntax structure and the signaling/parsing method of FIG. 20 may be the same as the description of FIG. 12 in a large frame, and an operation when an MPM flag is true may be as follows.

| Embodiment 20-1 |
| --- |
| If(intra_luma_mpm _flag[x0][y0]) {<br>  If(intra_luma_ref_idx[x0][y0]==0)<br>    Intra_luma_planar_flag[x0][y0]<br>  If(Intra_luma_planar_flag[x0][y0]==0)<br>    Intra_luma_mpm_idx[x0][y0]<br>  }else{<br>    Intra_luma_mpm_remainder[x0][y0]<br>  }|

In Embodiment 20-1, if information (intra_luma_mpm_flag[x0][y0]) indicating whether the MPM is used is true (for example, if the value is equal to 1), it is determined whether a reference sample line index (intra_luma_ref_idx [x0][y0]) value is equal to 0, and if the value is equal to 0, information (intra_luma_planar_flag[x0][y0]) indicating whether the planar mode is used may be determined. If a value indicated by the information (intra_luma_planar_flag [x0][y0]) indicating whether the planar mode is used is true, an intra luma planar mode may be indicated.

The planar mode may be a first one in the MPM list. The MPM list may have 6 elements or may have a preconfigured maximum size. Additionally, intra_luma_planar_flag may be entropy-coded using a context model by division into a case of a planar mode using an intra subpartition (ISP) mode and a case of otherwise.

In another case, if intra_luma_ref_idx[x0][y0]>0, information (Intra_luma_planar_flag[x0][y0]) indicating whether the planar mode is used may be inferred to a value of 0. Here, if the information indicating whether the planar mode is used is 0, this may indicate that the planar mode is not used. The decoder may not parse, from the bitstream, the information indicating whether the planar mode is used, and may determine the information indicating whether the planar mode is used, so that the planar mode is not used.

The decoder may determine whether the information, which indicates whether the planar mode is used, indicates that the planar mode is used. If the information indicating whether the planar mode is used indicates that the planar mode is not used, the decoder may obtain an MPM index (intra_luma_mpm_idx[x0][y0]) from the bitstream. The decoder may parse the MPM index (intra_luma_mpm_idx [x0][y0]) from the bitstream so as to determine a corresponding intra-screen (intra) prediction mode. If the information indicating whether the planar mode is used indicates that the planar mode is not used, the decoder may add at least one angular mode to the MPM list.

The decoder may generate the MPM list including at least one angular mode included in intra prediction, based on at least one of a previously reconstructed left block or a previously reconstructed upper block of the current block. The MPM list may include at least one candidate intra prediction mode. The MPM list may include at least one angular mode. The decoder may select one angular mode from the MPM list, based on the MPM index.

The MPM index (Intra_luma_mpm_idx) may be bypass-coded. If the MPM list includes six intra modes, the MPM index (Intra_luma_mpm_idx[x0][y0]) may indicate one of a second intra mode to a sixth intra mode. The decoder may select one intra prediction mode from the second mode to the sixth mode of the MPM list, based on the MPM index. That is, the MPM index (Intra_luma_mpm_idx[x0][y0]) may select one of five candidates included in the MPM. At least one of the five candidates may be an angular mode. As already described, the MPM list is not limited to six. For example, the MPM list may include five intra modes.

The decoder may select one intra prediction mode from the MPM list, based on the MPM index. The decoder may predict the current block by performing intra prediction based on the selected intra prediction mode.

If the information (intra_luma_mpm_flag[x0][y0]) indicating whether the MPM is used indicates that MPM is not used, the decoder may obtain, from the bitstream, an index (Intra_luma_mpm_remainder[x0][y0]) indicating the intra prediction mode. If the information (intra_luma_mpm_flag [x0][y0]) indicating whether the MPM is used indicates that the MPM is not used, this may indicate that the information indicating whether the MPM is used is false or has a value equal to 0. The decoder may predict the current block by performing intra prediction based on an index (Intra_luma_mpm_remainder[x0][y0]) indicating the intra prediction mode.

Alternatively, if the information indicating whether the MPM is used is true, the decoder may signal/parse the information indicating whether the planar mode is used. If the information indicating whether the planar mode is used is not true, the decoder may know the intra prediction mode via the MPM index (intra_luma_mpm_idx[x0][y0]). If the information indicating whether the MPM is used is true, this represents that the information indicating whether the MPM is used indicates that "the MPM is used". If the information indicating whether the planar mode is used is true, this represents that the information indicating whether the planar mode is used indicates that "the planar mode is used".

Such operations may be the same as Embodiment 20-1. A difference is that the MPM index (intra_luma_mpm_idx[x0] [y0]) may have a preconfigured maximum size. A preconfigured value may be an integer value greater than 0, and in this example, the value is assumed to be 6. The MPM index (intra_luma_mpm_idx[x0][y0]) may be bypass-coded for a maximum size of 6. However, the MPM index is not limited thereto, and may have various values.

Unlike Embodiment 20-1, conditions for signaling/parsing intra_luma_planar_flag[x0][y0] may be subdivided as follows.

| Embodiment 20-2 |
| --- |
| If(intra_luma_mpm_flag[x0][y0]){<br>If(intra_luma_ref_idx[x0][y0]==0&&intra_subpartitions_mode_flag [x0][y0]==0)<br>Intra_luma_planar_flag[x0][y0]<br>Else<br>If(intra_luma_ref_idx[x0][y0]==0&&intra_subpartitions_mode_flag[x0] [y0]==1)<br>Intra_luma_planar_flag[x0][y0]<br>If(Intra_luma_planar_flag[x0][y0]==0)<br>Intra_luma_mpm_idx[x0][y0]<br>}else{<br>Intra_luma_mpm_remainder[x0][y0]<br>} |

Example 20-2 shows a syntax structure based on a context model being different depending on a case in which the reference sample line index is 0 when intra_luma_planar_flag[x0][y0] is entropy-coded, and a case in which the reference sample line index is 0 and the ISP mode is used. Unlike Embodiment 20-1, a corresponding information value and the context model may be distinguished by concurrently determining whether the ISP is used when intra_luma_planar_flag is signaled/parsed.

Although the above descriptions have been provided in terms of the decoder, the descriptions may be applied to the encoder in the same manner. In the descriptions, the term "parsing" has been mainly described in relation to obtaining of information from a bit stream. However, in terms of the encoder, "parsing" may be interpreted as configuring information in the bit stream. Therefore, the term "parsing" is not limited to an operation of the decoder, and may be interpreted as an act of the encoder configuring a bit stream.

For example, in a method of encoding a video signal on the basis of intra prediction, an encoder may generate information indicating whether a current block uses a planar mode, when the current block uses a most probable mode (MPM), and a reference sample line index of the current block is 0. The encoder may generate a bitstream including the information indicating whether the planar mode is used. The encoder may include a processor and a memory, wherein the processor performs operations based on instructions stored in the memory.

In a device including a video bitstream stored in a non-transitory computer-readable medium: an encoder may generate information indicating whether a current block uses a planar mode, when the current block uses a most probable mode (MPM), and a reference sample line index of the current block is 0; and the encoder may generate a bitstream on the basis of the information indicating whether the planar mode is used. The bitstream may be stored in the non-transitory computer-readable medium.

Figure 21:
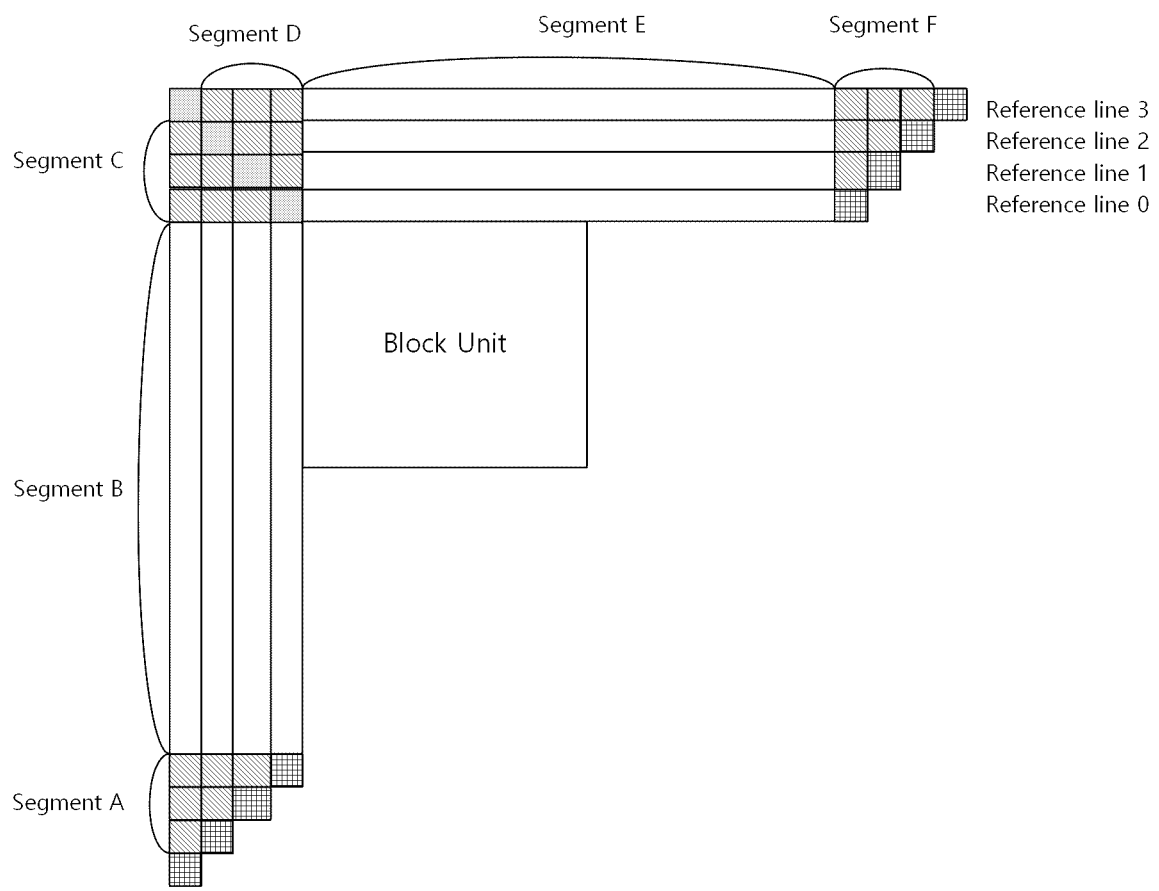
FIG. 21 is a diagram illustrating a plurality of reference sample lines (multi-reference line intra prediction (MRL)) used for intra prediction according to an embodiment of the present disclosure.

FIG. 21 is a diagram illustrating a plurality of reference sample lines (multi-reference line intra prediction (MRL)) used for intra prediction according to an embodiment of the present disclosure.

The encoder or the decoder basically uses a reference sample line closest to a current block, and may additionally use, for intra prediction, a single reference sample line or multiple reference sample lines. The number of reference sample lines to be used is defined, and if all reference sample lines are used, additional information transmission is omitted. However, in a case of using some reference sample lines, the encoder needs to inform the decoder of a reference sample line information indicator to be used.

This may be used for all intra prediction modes, and may be used except for a separate mode. In order to reduce a complexity/computation amount of the encoder and decoder, intra prediction may be performed only in a specific mode. For example, intra prediction may be performed using multiple reference sample lines only in a most probable mode (MPM) list. Intra prediction may be performed only in the angular mode excluding the DC and planar modes. In this case, the encoder may first apply a reference sample line index (MRL index) indicating a reference sample line used for prediction, and then may include the MPM index in a bitstream. Upon determination of the MRL index, the decoder may know that information (MPM flag) indicating whether the MPM is used is true, and may know a corresponding mode by the MPM index.

The encoder may include, in the bitstream, the information indicating whether the MPM is used and the MPM index. The decoder may obtain the information (MPM flag) indicating whether the current block uses the MPM, from the bitstream. The decoder may determine the intra prediction mode from the MPM list, based on the MPM index.

Figure 22:
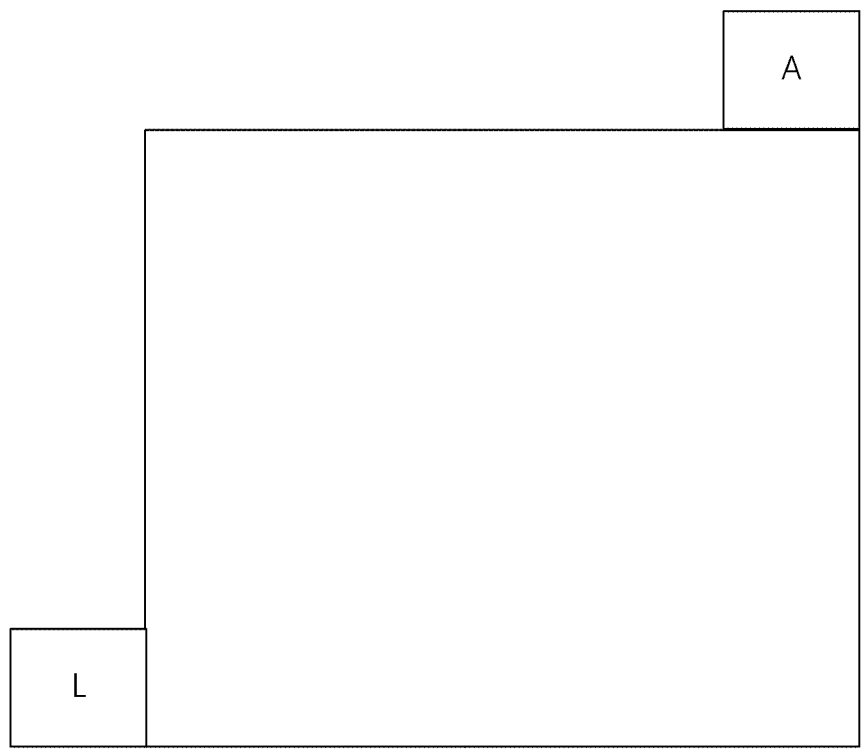
FIG. 22 is a diagram illustrating a position of a neighboring block required to create an MPM list in consideration of a prediction mode used in a block neighboring a current prediction block according to an embodiment of the present disclosure.

FIG. 22 is a diagram illustrating a position of a neighboring block required to create an MPM list in consideration of a prediction mode used in a block neighboring a current prediction block according to an embodiment of the present disclosure.

As shown in FIG. 22, only a left block of L and an upper block of A are considered from among neighboring blocks, and positions thereof may also be fixed to a specific position as in FIG. 22. Based on upper left coordinate of a current block of size W×H, L may be located at (−1, H−1), and A may be located at (W−1, −1).

The left block and the upper block included in the neighboring blocks may be previously reconstructed blocks before the current block. The left block or the upper block may be predicted based on the intra prediction mode during reconstruction. The decoder may configure the MPM list by division into three cases in consideration of the prediction modes of L and A. If the MRL is used only in the MPM list, an MPM configuration method considering the same is needed. The MPM configuration method should be different when the MRL is used and when the MRL is not used. The MRL may be used except for the planar and DC modes, and therefore the MPM list configuration method should be different so that the two modes are not included in the MPM list when the MRL is used. A size of the MPM list may be 3 to 6, and is not limited to a specific MPM size. In the present disclosure, an example will be described on the assumption that the MPM list has the size of 6.

When the encoder or decoder configures the MPM list configuration differently depending on whether the MRL is applied, the MPM list of a case where the MRL is not applied is assumed to be MPM_LIST_NO_MRL. When the MRL is applied, MPM_LIST_MRL may be configured differently from MPM_LIST_NO_MRL, by applying the following scheme. The encoder or the decoder may reduce elements of the MPM list by deleting a corresponding mode from the MPM list including planar or DC modes in MPM_LIST_NO_MRL. For example, the encoder or the decoder may configure the MPM list of 4 by deleting the planar and DC modes from the MPM list of 6 including the planar and DC modes. In this configuration, the encoder or decoder may configure the index of the MPM list of MPM_LIST_NO_MRL to a previous value in consideration of the deleted planar or DC modes. In the MPM_LIST_NO_MRL configuration method, if the planar mode and the DC mode are filled in the MPM list, MPM of a subsequent turn is filled in a corresponding index without including the planar and DC modes. If the method of creating the existing MPM list includes both or only one of the planar and DC modes, the encoder or the decoder does not add the planar/DC mode to the corresponding index, the MPM of the subsequent turn is filled, and a total MPM size is also determined in the form in which one or two of the modes are missing from the total number of MPMs. One or two modes are omitted from the determined total number of MPMs, so that an amount of information may be reduced in terms of signaling the MPM index. For example, in a case of binarization using a truncated unary (TU) scheme, if the size is reduced from 6 to 4, 1 bit may be reduced.

A corresponding mode may be changed to the angular mode and added in the MPM list including planar or DC modes in MPM_LIST_NO_MRL. That is, the MPM list may include only the angular mode. A new angular mode is added by replacing the planar or DC mode that is a non-angular mode, and the corresponding mode may be configured by applying an additional offset by using the angular mode defined in MPM_LIST_NO_MRL. The offset value may be configured to an angular mode that is close to an angular mode value of the MPM list, such as ((−/+) or (+/−)) 1, 2, 3, 4, etc. Alternatively, the missing mode may be filled from a remaining mode. The encoder or the decoder may fill the missing mode by fixing a specific position or selecting one or two modes in ascending/descending order of index. When the remaining mode is further divided into a selected mode and a non-selected mode, one or two may be selected and filled at a specific position in a selected mode. The selection may be made in ascending/descending order of index.

Based on the angular mode of adjacent blocks such as L and A, a value of a non-angular mode, such as the planar mode and the DC mode, compared to MPM_LIST_NO_MRL may be additionally configured using an angular mode value by prioritizing specific positions of L and A. For example, if both L and A have the angular mode, and L is applied in preference to A, a new angular mode, as a replacement for the planar or the DC mode, is an adjacent mode of the angular mode, which is defined in L, and may be configured by applying an offset. The opposite is also possible.

The planar/DC mode of MPM_LIST_NO_MRL may be replaced using a specific angular mode by prioritizing a value of the specific angular mode among angular modes. For example, the planar/DC mode may be replaced by applying an offset (including 0) to the corresponding mode, by prioritizing the specific angular mode, such as VER_IDX or HOR_IDX. In a case of a pre-included MPM list, a different offset value may be applied, and the value may be filled instead.

The planar/DC mode may be replaced by prioritizing the specific angular mode or a specific position in L and A according to the shape of the current block. For example, if the current block is non-square, the planar/DC mode may be replaced using the angular mode of A or L positioned on the long side, or may be replaced using the angular mode of VER/HOR. For example, if the block has a large width, the angular mode of VER or A is prioritized, and the planar/DC mode may be replaced by applying an offset (including 0) to the corresponding value. As another example, if the current block is non-square, the planar/DC mode may be replaced using the angular mode of A or L positioned on the short side.

The described method of configuring the MPM list according to whether the MRL is applied may be applied by combining one or multiple schemes, wherein the MPM list can be fixed to have 6 modes and used, or various numbers can be applied to the MPM list. Descriptions are provided in assumption of the MPM list, but the same scheme may be extended and applied to a configuration of a non-MPM list.

The following is a method of configuring the MPM list in consideration of MRL, and is divided into three cases by considering the prediction mode used in L and A.

Case 1: Examples of configuring the MPM list when there is no angular mode in L and A, when none of neighboring L and A exists, or when one of two does not exist and the remaining one is not in the angular mode:
mpm[0]=VER_IDX;
mpm[1]=HOR_IDX;
mpm[2]=VER_IDX−4;
mpm[3]=VER_IDX+4;
mpm[4]=HOR_IDX−4;
mpm[5]=HOR_IDX+4;

Case 2: An example of configuring the MPM list when there is one angular mode in L and A.

The MPM list is generated based on the following sequence:

Sequence: {left mode, above mode, left mode−1, left mode+1, left mode−2, left mode+2, vertical mode, horizontal mode}

If L and A are in the same angular mode, an upper block mode (above mode) is excluded from the above sequence. A left block mode (left mode) may be an angular mode (AngMode).

leftIntraDir=left mode
aboveIntraDir=above mode
AngMode is the available angular mode after checking left and above mode.
offset=62;
mod=offset+3;
mpm[0]=AngMode;
mpm[1]=((AngMode+offset)%mod)+2;//−1 mode of angular mode
mpm[2]=((AngMode−1)%mod)+2;//+1 mode of the angular mode;
mpm[3]=((AngMode+offset−1)%mod)+2;//−2 mode of the angular mode
mpm[4]=((AngMode)%mod)+2;//+2 mode of the angular mode
mpm[5]=(AngMode>48&&AngMode<52)?HOR_IDX: VER_IDX;

Case 3: L and A may be different angular modes.
The sequence may be as follows.
Sequence 1: {left mode, above mode, left mode−1, left mode+1, above mode−1, above mode+1, left mode−2, left mode+2,};
Sequence 2: {left mode, above mode, left mode−1, left mode+1, above mode−1, above mode+1, left mode−2, above mode+2}; or
Sequence 3: {left mode, above mode, left mode−1, left mode+1, above mode−1, above mode+1, Vertical mode, Horizontal mode}

If a value obtained by adding −1 to an index of the left block mode (left mode) based on sequence 1 is the same as the intra prediction mode (above mode) of the upper block, a value obtained by adding −1 to an index of the intra prediction mode (above mode) of the upper block may have priority over a value obtained by adding +1 to the index of the left mode (left mode) of the left block. That is, if a calculated mode of a current operation is the same as that having already been calculated in a previous operation and included in the MPM list, it is determined whether the mode is for L or A and, for example, if the mode is the L mode, a value of a subsequent turn in the sequence of the L mode is applied. Alternatively, calculation is performed to fill MPM according to a predetermined sequence as in sequence 1, wherein if a calculated mode is the same as the mode in the MPM lists, which has already been calculated, calculation is performed for a subsequent turn to fill the MPM list.

mpm[0]=leftIntraDir;
mpm[1]=aboveIntraDir;

For mpm[2] to mpm[5], values thereof are determined by one of the MPM configuration sequences 1 to 3, wherein if a mode is the same as the already-filled MPM, configuration is performed using a subsequent calculation method so as to avoid overlapping with each other.

Another example of MPM configuration when using MRL

MPM_set_0 configures the MPM in the same sequence as that of case 1 described above.

MPM_set_1: If the intra prediction mode (left mode) of the left block and the intra prediction mode (above mode) of the upper block are the same and are the angular mode, or if only one of the left mode and the above mode is the angular mode, configuration is performed as follows. The angular mode is called AngMode.

mpm[0]=AngMode
mpm[1]=2+((AngMode+62)%65)//A−1
mpm[2]=2+((AngMode−1)%65)//A+1
mpm[3]=2+((AngMode+61)%65)//A−2
mpm[4]=2+((AngMode)%65)//A+2
mpm[5]=2+((AngMode+60)%65)//A−3

As described above, the decoder may obtain, from a received bitstream, information indicating whether the current block uses the MPM. The decoder may determine to generate the MPM list, based on the information indicating whether the MPM is used. The MPM list may be generated as in MPM_set_1. The above MPM_set_1 is an example in which the offset is 62 and the mod is 65. However, MPM_set_1 is not limited thereto. The offset may be 61. The mod may be 64.

If at least one of the intra prediction mode of the left block of the current block or the intra prediction mode of the upper block of the current block is the angular mode, the decoder may generate the MPM list by using only the angular mode. The MPM list may be generated as in MPM_set_1. AngMode may be the intra prediction mode (left mode) of the left block or the intra prediction mode (above mode) of the upper block. MPM_set_1 is a case in which the intra prediction mode (left mode) of the left block or the intra prediction mode (above mode) of the upper block are the same, and therefore the MPM list may be determined using one of the intra prediction mode (left mode) of the left block or the intra prediction mode (above mode) of the upper block.

As in the above-described MPM_set_1, if at least one of the intra prediction mode of the upper block or the intra prediction mode of the left block is an angular mode, the MPM list may include only the angular mode. That is, the MPM list may not include the DC mode and the planar mode. The decoder may determine the intra prediction mode, based on the generated MPM list. The decoder may predict the current block, based on the determined intra prediction mode.

A procedure of generating the MPM list according to an embodiment of the present disclosure is as follows. If the intra prediction mode of the left block and the intra prediction mode of the upper block are the same, and the intra prediction mode of the left block is an angular mode, the decoder may generate the MPM list on the basis of at least one among: the intra prediction mode (AngMode) of the left block; an angular mode corresponding to an index (2+((AngMode+offset)%mod)) that is smaller than the index of the intra prediction mode of the left block by 1; an angular mode corresponding to an index (2+((AngMode−1)%mod)) greater than the index of the intra prediction mode of the left block by 1; an angular mode corresponding to an index (2+((AngMode+offset−1)%mod)) that is smaller than the index of the intra prediction mode of the left block by 2; and an angular mode corresponding to an index (2+(AngMode%mod)) greater than the index of the intra prediction mode of the left block by 2. Here, the offset may be 61 and the mod may be offset+3.

If the intra prediction mode of the left block and the intra prediction mode of the upper block are not the same, and if only one of the intra prediction mode of the left block or the intra prediction mode of the upper block is an angular mode, the decoder may generate the MPM list on the basis of at least one among: the intra prediction mode (AngMode) of the block in the angular mode, an angular mode corresponding to an index (2+((AngMode+offset)%mod)) that is smaller than the index of the intra prediction mode of the block in the angular mode by 1; an angular mode corresponding to an index (2+((AngMode−1)%mod)) greater than the index of the intra prediction mode of the block in the angular mode by 1; an angular mode corresponding to an index (2+((AngMode+offset−1)%mod)) that is smaller than the index of the intra prediction mode of the block in the angular mode by 2; and an angular mode corresponding to an index (2+(AngMode%mod)) greater than the index of the intra prediction mode of the block in the angular mode by 2. Here, the offset may be 61 and the mod may be offset+3. The decoder may use the following equation to determine the prediction mode that is an angular mode, from the intra prediction mode of the left block or the intra prediction mode of the upper block.

> Index of intra prediction mode of block in angular mode=Max(index of intra prediction mode of left block, index of intra prediction mode of upper block)

If the index of the planar mode is 1, the index of the DC mode is 0, the angular mode has an index greater than 1, and only one of the intra prediction mode of the left block and the intra prediction mode of the upper block is the angular mode, the greater of the index of the intra prediction mode of the left block and the index of the intra prediction mode of the upper block is the angular mode.

MPM_set_2: If the intra prediction mode (left mode) of the left block and the intra prediction mode (above mode) of the upper block are not the same, and both have a value greater than 1, configuration may be performed as follows. Here, both intra prediction modes having the value greater than 1 represents that the intra prediction mode thereof is not the DC mode or the planar mode.

mpm[0]=leftIntraDir;
mpm[1]=aboveIntraDir;

Descriptions are provided as follows by comparing index sizes of leftIntraDir and aboveIntraDir and assuming that a larger value is leftIntraDir.

mpm[2]=(leftIntraDir+62)%65+2;//leftIntraDir−1;
mpm[3]=(leftIntraDir−1)%65+2;//leftIntraDir+1;
mpm[4]=(leftIntraDir+61)%65+2;//leftIntraDir−2;
mpm[5]=(leftIntraDir)%65+2;//leftIntraDir+2;

When the mpm sequence is filled in, if an mpm is the same as the mpm filled in advance, an absolute value of an offset value, such as −1 and +1, may be increased by 1 or by 2, or by a preconfigured size.

mpm[2] to mpm[5] may be configured by comparing the index sizes of leftIntraDir and aboveIntraDir and applying the offset value, as above, based on a larger value or a smaller value thereof.

According to an embodiment of the present disclosure, if the intra prediction mode (left mode) of the left block and the intra prediction mode (above mode) of the upper block are not the same, and the intra prediction mode of the left block and the intra prediction mode of the upper block are the angular mode, the decoder may generate the MPM list on the basis of comparison the sizes of the index of the intra prediction mode of the left block and the index of the intra prediction mode of the upper block. For example, the MPM list may be generated using a small value or a large value of the index of the intra prediction mode of the left block and the index of the intra prediction mode of the upper block.

More specifically, if the intra prediction mode (left mode) of the left block and the intra prediction mode (above mode) of the upper block are not the same, and the intra prediction mode of the left block and the intra prediction mode of the upper block are the angular mode, the decoder may add, to the MPM list, the intra prediction mode of the left block and the intra prediction mode of the upper block. Further, the decoder may generate the MPM list on the basis of at least one intra prediction mode of: an angular mode corresponding to an index greater than the index of the prediction mode of the left block by 1; an angular mode corresponding to an index greater than the index of the intra prediction mode of the upper block by 1; an angular mode corresponding to an index smaller than the index of the intra prediction mode of the left block by 1; an angular mode corresponding to an index smaller than the index of the intra prediction mode of the upper block by 1; an angular mode corresponding to an index greater than the index of the intra prediction mode of the left block by 2; an angular mode corresponding to an index greater than the index of the intra prediction mode of the upper block by 2; an angular mode corresponding to an index smaller than the index of the intra prediction mode of the left block by 2; or an angular mode corresponding to an index smaller than the index of the intra prediction mode of the upper block by 2.

As above, if the decoder adds, to the MPM list, the value greater than or smaller than the index of the intra prediction mode of the left block or the index of the intra prediction mode of the upper block by 1, or adds, to the MPM list, the value greater than or smaller than the index of the intra prediction mode of the left block or the index of the intra prediction mode of the upper block by 2, there is a possibility that the MPM list includes overlapping angular modes. That is, if the difference of the index of the intra prediction mode of the left block or the index of the intra prediction mode of the upper block is 1, 2, or is greater than 62, there is a possibility that the MPM list includes overlapping angular modes. Therefore, the decoder may generate the MPM list in the manner described below.

If the difference of the index of the intra prediction mode of the left block and the index of the intra prediction mode of the upper block is equal to 1, the decoder may generate the MPM list on the basis of at least one of: an angular mode corresponding to an index smaller than the smaller of the index of the intra prediction mode of the left block and the index of the intra prediction mode of the upper block by 1; an angular mode corresponding to an index greater than the greater of the index of the intra prediction mode of the left block and the index of the intra prediction mode of the upper block by 1; or an angular mode corresponding to an index smaller than the smaller of the index of the intra prediction mode of the left block and the index of the intra prediction mode of the upper block by 2.

If the difference of the index of the intra prediction mode of the left block and the index of the intra prediction mode of the upper block is equal to or greater than 62, the decoder may generate the MPM list on the basis of at least one of: an angular mode corresponding to an index greater than the smaller of the index of the intra prediction mode of the left block and the index of the intra prediction mode of the upper block by 1; an angular mode corresponding to an index smaller than the greater of the index of the intra prediction mode of the left block and the index of the intra prediction mode of the upper block by 1; or an angular mode corresponding to an index greater than the smaller of the index of the intra prediction mode of the left block and the index of the intra prediction mode of the upper block by 2.

If the difference of the index of the intra prediction mode of the left block and the index of the intra prediction mode of the upper block is equal to 2, the decoder may generate the MPM list on the basis of at least one of: an angular mode corresponding to an index greater than the smaller of the index of the intra prediction mode of the left block and the index of the intra prediction mode of the upper block by 1; an angular mode corresponding to an index smaller than the smaller of the index of the intra prediction mode of the left block and the index of the intra prediction mode of the upper block by 1; or an angular mode corresponding to an index greater than the greater of the index of the intra prediction mode of the left block and the index of the intra prediction mode of the upper block by 1.

If the difference of the index of the intra prediction mode of the left block and the index of the intra prediction mode of the upper block is not equal to 1, if the difference of the index of the intra prediction mode of the left block and the index of the intra prediction mode of the upper block is smaller than 62, and if the difference of the index of the intra prediction mode of the left block and the index of the intra prediction mode of the upper block is not equal to 2, the decoder generates the MPM list on the basis of at least one of: an angular mode corresponding to an index smaller than the smaller of the index of the intra prediction mode of the left block and the index of the intra prediction mode of the upper block by 1; an angular mode corresponding to an index greater than the smaller of the index of the intra prediction mode of the left block and the index of the intra prediction mode of the upper block by 1; or an angular mode corresponding to an index smaller than the greater of the index of the intra prediction mode of the left block and the index of the intra prediction mode of the upper block by 1.

As another example 2 of the MPM configuration when using MRL, a method for determination excluding a planar and/or DC mode from the existing MPM list configuration method is as follows.

If both left and above modes are not angular modes,
mpm[0]=VER_IDX;
mpm[1]=HOR_IDX;
mpm[2]=VER_IDX−4;
mpm[3]=VER_IDX+4;

If there is at least one angular mode in the left and above modes, configuration may be performed as follows. In this case, a sequence of modes inserted in the MPM list may be given as follows.

{left mode, above mode, planar, DC, left mode−1, left mode+1, vertical mode, horizontal mode}

The earlier turn in the above sequence may represent the earlier turn to be included in the MPM list. The left mode represents the intra prediction mode of the left block, and the above mode represents the intra prediction mode of the upper block. The vertical mode is one of angular modes and refers to a vertical mode. The horizontal mode refers to a horizontal mode.

If the intra prediction mode of the left block and the intra prediction mode of the upper block are the same, a special case may occur. In this case, the intra prediction mode of the upper block may not be included in the MPM list.

For example, assume the following.
leftIntraDir=left mode
aboveIntraDir=above mode AngMode may be an angular mode available after determining the left intra prediction mode and the upper intra prediction mode.

availNonAngMode may be a non-angular mode available after determining the left intra prediction mode and the upper intra prediction mode. If the non-angular mode is not available, availNonAngMode may be −1 (availNonAngMode=−1).

Based on the above assumption, the MPM list may be generated as follows.
offset=62;
mod=offset+3;
mpm[0]=AngMode;
mpm[1]=((AngMode+offset)%mod)+2;//−1 mode of angular mode
mpm[2]=((AngMode−1)%mod)+2;//+1 mode of the angular mode
mpm[3]=(AngMode>48&&AngMode<52)?HOR_IDX: VER_IDX;

If the intra prediction mode (left mode) of the left block and the intra prediction mode (above mode) of the upper block are different angular modes, the MPM list may be configured as follows.

According to definitions, both the intra prediction mode (left mode) of the left block and the intra prediction mode (above mode) of the upper block are angular modes and are different from each other. The sequence of modes inserted in the MPM list may be given as follows.

{left mode, above mode, planar, DC, left mode−1, left mode+1, above mode−1, above mode+1}

The earlier turn in the above sequence may represent the earlier turn to be included in the MPM list.

There may occur a case in which an angular mode corresponding to the index smaller than the index of the intra prediction mode of the left block by 1 is the same as the intra prediction mode of the upper block. In this case, the angular mode corresponding to the index smaller than the index of the intra prediction mode of the upper block by 1 may be included in the MPM list before the angular mode corresponding to the index greater than the index of the intra prediction mode of the left block by 1.

For example, the MPM list may be generated by the following procedures.

```
leftIntraDir=left mode
aboveIntraDir=above mode
mode=leftIntraDir;
angMinus=((mode+offset)%mod)+2;//angular−1;
angPlus=((mode−1)%mod)+2;//angular+1;
mpm[0]=leftIntraDir;m[0]=AngMode;
mpm[1]=aboveIntraDir;
if (angMinus==aboveIntraDir)
{
mpm[2]=((aboveIntraDir+offset)%mod)+2;//above; angular−1;
mpm[3]=angPlus;
}
else
{
mpm[2]=angMinus;
if (aboveIntraDir==angPlus) mpm[3]=((aboveIntraDir−1)%mod)+2;
else mpm[3]=angPlus;
}
```

As another example 3 of the MPM configuration when using MRL, the method for determination excluding a planar and/or DC mode from the existing MPM list configuration method is expressed as the following pseudo codes.

1. The candModeList[x] with x=0 . . . 5 is derived as follows:
CandModeList[0]=candIntraPredModeA
CandModeList[1]=!candIntraPredModeA
CandModeList[2]=INTRA_ANGULAR50
CandModeList[3]=INTRA_ANGULAR18
CandModeList[4]=INTRA_ANGULAR46
CandModeList[5]=INTRA_ANGULAR54

If candIntraPredModeB is equal to candIntraPredModeA, the following applies:
If candIntraPredModeA is larger than 1, candModeList[x] with x=0 . . . 5 is derived as follows:
CandModeList[0]=candIntraPredModeA
CandModeList[1]=2+((candIntraPredModeA+62)%65)
CandModeList[2]=2+((candIntraPredModeA−1)%65)
CandModeList[3]=2+((candIntraPredModeA+61)%65)
Otherwise (candIntraPredModeB is not equal to candIntraPredModeA), the following applies:
Set the variable biggerIdx equals to biggerIdx=candModeList[0]> candModeList[1]?0:1
If both of candIntraPredModeA and candIntraPredModeB are larger than 1, candModeList[x] with x=2 . . . 5 is derived as follows:
candModeList[0]=candIntraPredModeA
candModeList[1]=candIntraPredModeB
If candModeList[biggerIdx]−candModeList[biggerIdx] equals to neither 64 nor 1, the following applies:
candModeList[2]=2+((candModeList[biggerIdx]+62)%65)
candModeList[3]=2+((candModeList[biggerIdx]−1)%65)
Otherwise, the following applies:
candModeList[2]=2+((candModeList[biggerIdx]+61)%65)
candModeList[3]=2+(candModeList[biggerIdx]%65)

FIG. 23 is a diagram illustrating a method of inducing a new MPM by applying offsets, such as +1 and −1, to a most probable mode (MPM) according to an embodiment of the present disclosure.

In MPM configuration methods, a new MPM may be created by applying offset1, based on an angular mode used in a neighboring block. Here, offset1 is −1, +1, −2, +2, etc., and a size and a sequence may vary depending on a method.

For example, configuration may be performed by the following methods.

Example 1

Offset2=61, Mod=offset2+3
AngMod: angular mode
Example 1-1: ((Angmod+offset)%Mod)+2: same as applying−1 to angular mode
Example 1-2: ((Angmod−1)%Mod)+2: same as applying+1 to angular mode
Example 1-3: ((Angmod+offset−1)%Mod)+2: same as applying−2 to angular mode
Example 1-4: (Angmod%Mod)+2: same as applying+2 to angular mode
Example 1-5: ((Angmod+offset−2)%Mod)+2: same as applying−3 to angular mode The above equations are reorganized as follows.
The index smaller than the index of the intra prediction mode by 1 may be obtained by the following equations.

Index smaller than index of intra prediction mode by 1=((index of intra prediction mode+offset)%(offset+3))+2

The index greater than the index of the intra prediction mode by 1 may be obtained by the following equations.

Index greater than index of intra prediction mode by 1=((index of intra prediction mode−1)%(offset+3))+2

The index smaller than the index of the intra prediction mode by 2 may be obtained by the following equations.

Index smaller than index of intra prediction mode by 2=((index of intra prediction mode+offset−1)%(offset+3))+2

The index greater than the index of the intra prediction mode by 2 may be obtained by the following equations.

Index greater than index of intra prediction mode by 2=((Index of intra prediction mode)%(offset+3))+2

Here, the offset may be 61.

In a case where there are 65 angular modes, if signaling is possible using from 2 to 66 for an angular mode index, angular mode 3 is derived when 1 is increased in angular mode 66 in Example 1. This may be seen in FIG. 23(a). In Example 1, if the angular mode is 2, the angular mode becomes 65 when −1 is applied, which may be seen in FIG. 23(b). If a certain number is added (angular mode+offset) in the current angular mode, and an index thereof becomes greater than 66, operation may not be performed as intended in Example 1, and some cases of Example 1 may have a result value +1. If a certain number is subtracted (angular mode 2−offset) from the current angular mode, and the index thereof becomes smaller than 2, operation may not be performed as intended in Example 1, and some cases may have a result value of Example 1-1.

Example 2

Offset3=62, Mod=offset3+3
AngMod: angular mode
AngMod: angular mode
Example 2-1: ((Angmod+offset)%Mod)+2: same as applying −1 to angular mode
Example 2-2: ((Angmod−1)%Mod)+2: same as applying+1 to angular mode
Example 2-3: ((Angmod+offset−1)%Mod)+2: same as applying −2 to angular mode
Example 2-4: (Angmod%Mod)+2: same as applying+2 to angular mode
Example 2-5: ((Angmod+offset−2)%Mod)+2: same as applying −3 to angular mode Example 2 is an example of using an offset3 value of 62 instead of an offset2 value of 61 in Example 1. In this case, if (angular mode+offset value) is greater than 66, it may be seen in FIG. 23(c) that operation is performed as intended in Example 2, unlike the case of Example 1. Even if (angular mode−offset value) is smaller than 2, it may be seen in FIG. 23(d) that operation is performed as intended in Example 2.

Figure 24:
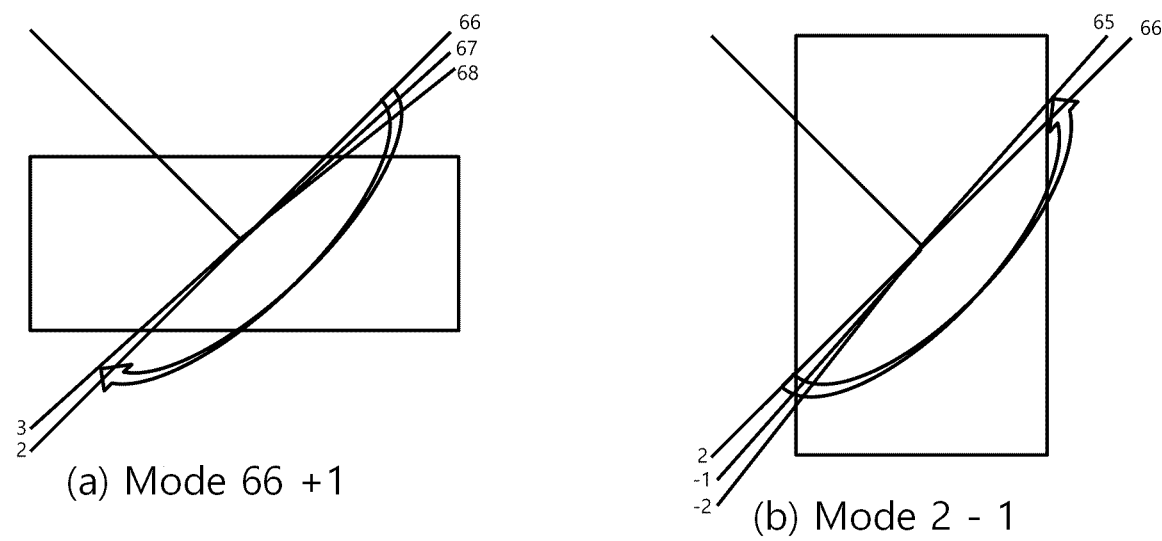
FIG. 24 is a diagram illustrating an example of applying, to a non-square block, a method for inducing a new MPM by applying offsets, such as +1 and −1, to a most probable mode (MPM) according to an embodiment of the present disclosure.

FIG. 24 is a diagram illustrating an example of applying, to a non-square block, a method for inducing a new MPM by applying offsets, such as +1 and −1, to a most probable mode (MPM) according to an embodiment of the present disclosure.

A non-square block may use an added wide angular mode. An absolute angle greater than existing angular modes 2 to 66 may be available. If an MPM configuration method for this non-square block is the same as that in Example 1, configuration may be performed as follows. In a case of one angular mode of a neighboring block, the mode is 2.

Offset2=61, Mod=offset2+3
AngMod=2,
Example 1-1: ((Angmod+offset)%Mod)+2=65: same as applying −1 to angular mode
Example 1-2: ((Angmod−1)%Mod)+2=3: same as applying +1 to angular mode Example 1-3: ((Angmod+offset−1)%Mod)+2=64: same as applying −2 to angular mode
Example 1-4: (Angmod%Mod)+2=4: same as applying+2 to angular mode
Example 1-5: ((Angmod+offset−2)%Mod)+2=63: same as applying −3 to angular mode
Angular modes derived in sequence from angular mode 2 are 65, 3, 64, 4, and 63, and 6 MPM may include at least one of the following angular modes.
6 MPM=[2, 65, 3, 64, 4, 63]

This may be seen in FIG. 24(a), in which mode 2 indicates mode 67, mode 3 indicates 68, and mode 4 indicates an angular mode extended to 69. Therefore, in a rectangular block, the 6 MPM becomes [67, 65, 68, 64, 69, 63]. In a case of using the extended angular mode, −2, +1, −3, +2, and −4 are applied, instead of applying −1, +1, −2, +2, and +3 derived from reference angular mode 67 as intended in Example 1. This deviates from intention to make the most of a peripheral angle of the reference angular mode.

As another example, when the angular mode is 66, example 1 is provided as follows.
Offset2=61, Mod=offset2+3
AngMod=66,
Example 1-1: ((Angmod+offset)%Mod)+2=65: same as applying −1 to angular mode
Example 1-2: ((Angmod−1)%Mod)+2=3: same as applying +2 to angular mode
Example 1-3: ((Angmod+offset−1)%Mod)+2=64: same as applying −2 to angular mode
Example 1-4: (Angmod%Mod)+2=4: same as applying +3 to angular mode
Example 1-5: ((Angmod+offset−2)%Mod)+2=63: same as applying −3 to angular mode
Angular modes derived in sequence from angular mode 66 are 65, 3, 64, 4, and 63, and 6 MPM may include at least one of the following angular modes.
6 MPM=[66, 65, 3, 64, 4, 63]

In a case of a vertically rectangular block as shown in FIG. 24(b), if a wide angle is used, mode 66 indicates mode −1, mode 65 indicates −2, mode 64 indicates −3, and mode 63 indicates −4. Accordingly, 6MPM in the corresponding block may include at least one of the following angular modes.
6 MPM=[−1, −2, 3, −3, 4, −4]

Instead of applying −1, +1, −2, +2, and +3 values to wide angular mode −1 of the block, −1, 3, −2, +3, and −3 are applied. This deviates from intention to make the most of a peripheral angle mode of angular mode −1.

To this end, MPM is configured using the method of Example 1 or the method of Example 2 according to the presence or absence of a square block. The method of Example 1 is applied to a square block, and the method of Example 2 is used if it is not a square block.

Figure 25:
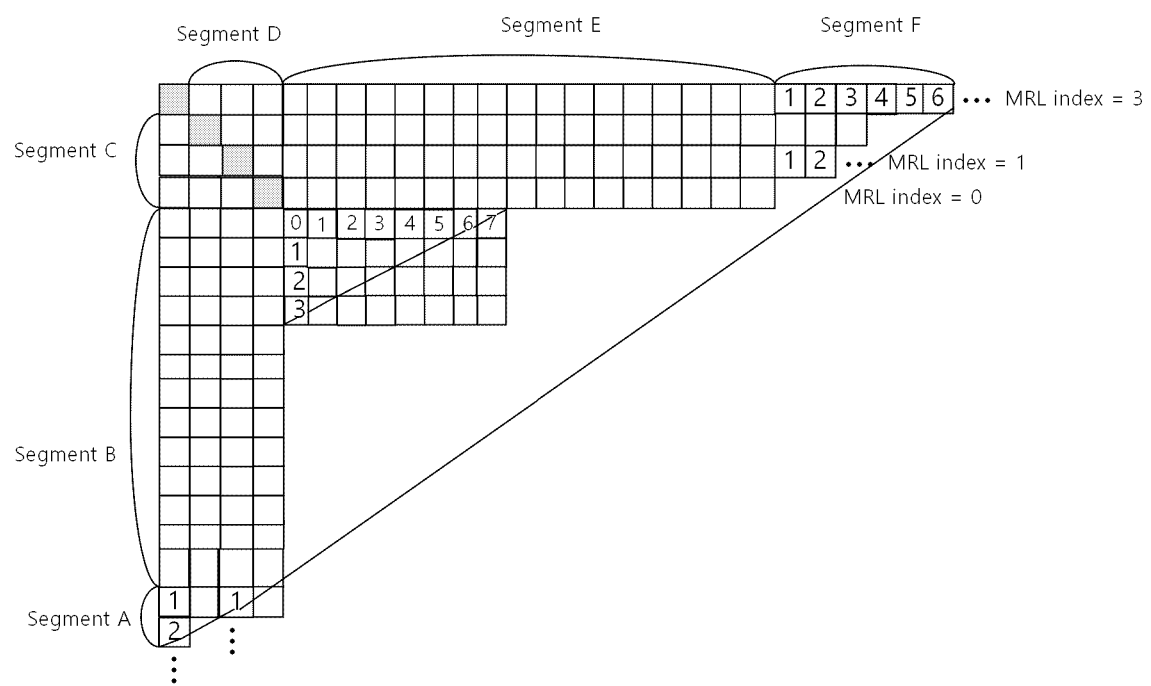
FIG. 25 is a diagram for describing a reference sample for a rectangular block, to which an MRL is applied, according to an embodiment of the present disclosure.

FIG. 25 is a diagram for describing a reference sample for a rectangular block, to which an MRL is applied, according to an embodiment of the present disclosure.

As described above, the decoder may obtain the index of the intra prediction mode of the current block, based on the received bitstream. More specifically, the decoder may obtain a syntax element from the bitstream, and may obtain the index of the intra prediction mode of the current block, based on the syntax element.

The decoder may obtain a reference sample line index of the current block from the received bitstream. The decoder may obtain the reference sample line index by parsing the bitstream.

The decoder may generate a plurality of reference samples and an additional reference sample, based on at least one of the index of the intra prediction mode or the reference sample line index.

FIG. 25 shows a rectangular case in which W:H=2:1. The width and length of the current block are the same in FIG. 21, whereas the width and height of the current block may be different from each other in FIG. 25.

In FIG. 25, segment B, segment C, segment D, or segment E may refer to multiple reference samples. The number of multiple reference samples may be determined regardless of reference sample line indices. For example, the number of multiple reference samples may be determined based on the width and height of the current block.

In FIG. 25, segment A or segment F may refer to an additional reference sample. The number of multiple reference samples may be determined based on at least one of an index of an intra prediction mode or a reference sample line index. For example, the number of multiple reference samples may be determined based on the width and height of the current block. This will be described in more detail below.

Segment A and segment F of FIG. 25 may have a difference in the number of samples, compared to segment A and segment F of FIG. 21. A larger difference in a ratio of W:H may result a larger difference in the number of samples. If an angular mode greater than 45 degrees is applied to a horizontal or vertical rectangular prediction block, an additional reference sample may be generated unlike a square prediction block.

The encoder or the decoder may determine the number of additional reference samples, based on a reference sample line index or a ratio of the width and height of the current block.

For example, in segment A, as many additional reference samples as the reference sample line index (MRL index) may be generated. More specifically, the number of additional reference samples of segment A may be defined as MRL index+offset. A predefined number of samples may be used for the offset. In FIG. 25, in a case of 3 reference samples with a MRL_index of 2, as many additional reference samples as 3+offset may be generated.

In segment F, as many additional reference samples as (MRL_index×whRatio) may be generated. Here, MRL_index may denote a reference sample line index, and whRatio may denote a ratio of the width and height of the current block. The encoder or the decoder may determine the number of additional reference samples to be a reference sample line index×a ratio of the width and height of the current block+offset. The encoder or the decoder may generate, in segment F, as many additional reference samples as (MRL_index×whRatio+(MRL_index or Offset)). Here, the offset may be 2 or 3. That is, as many additional reference samples as ((2 or 3)+MRL_index×whRatio) may be generated. The variable whRatio may be Min(Abs(Log 2(nTbW/nTbH)), 2). However, whRatio is not limited thereto, and may be max(nTbW/nTbH, 1).

FIG. 25 shows a form of a horizontal rectangular prediction block, and segment F may thus require more samples than segment A. In contrast, in a vertical rectangular prediction block type, segment F may require more samples than segment A.

Figure 26:
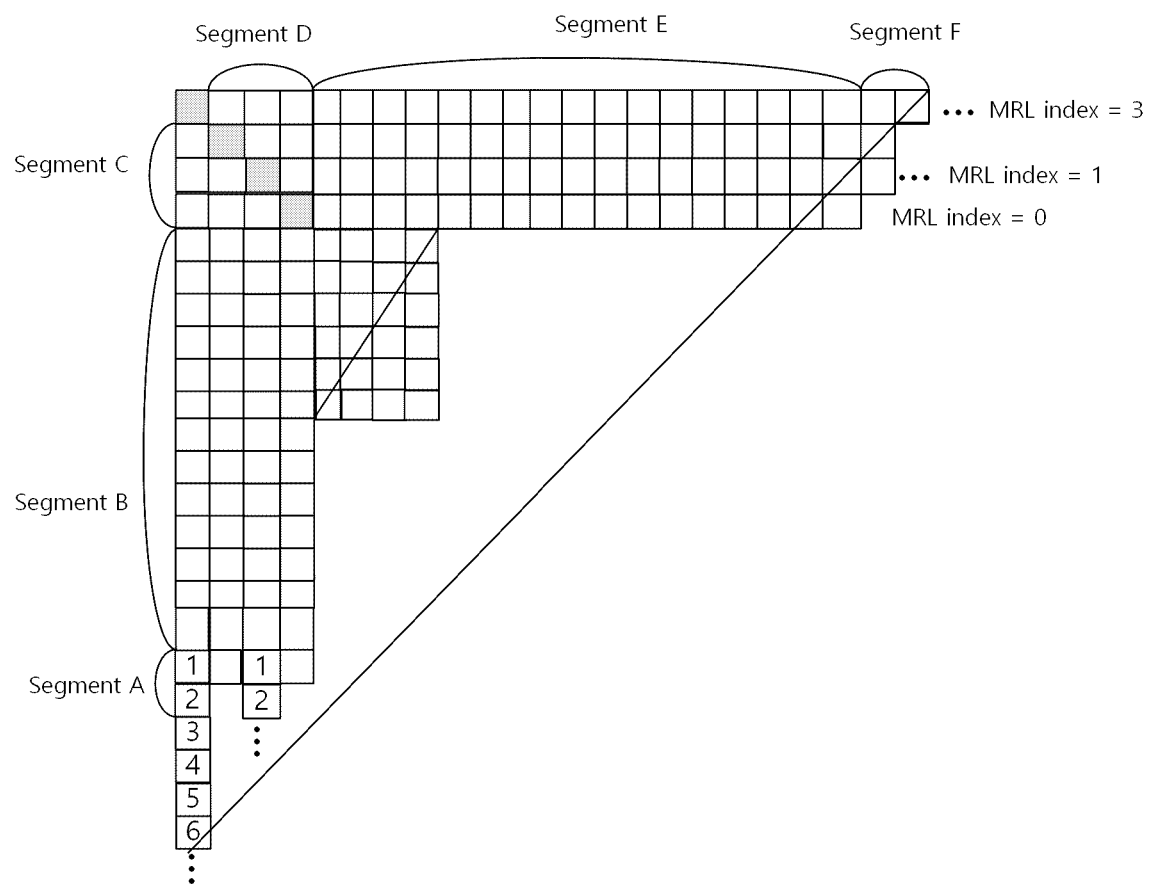
FIG. 26 is a diagram for describing a reference sample for a rectangular block, to which an MRL is applied, according to an embodiment of the present disclosure.

FIG. 26 is a diagram for describing a reference sample for a rectangular block, to which an MRL is applied, according to an embodiment of the present disclosure.

FIG. 26 shows a case of a rectangle in which W:H=1:2. Unlike FIG. 25, FIG. 26 shows a vertical rectangular prediction block. The decoder or the encoder may apply, to segment A of FIG. 26, the methods applied to segment F of FIG. 25.

Figure 27:
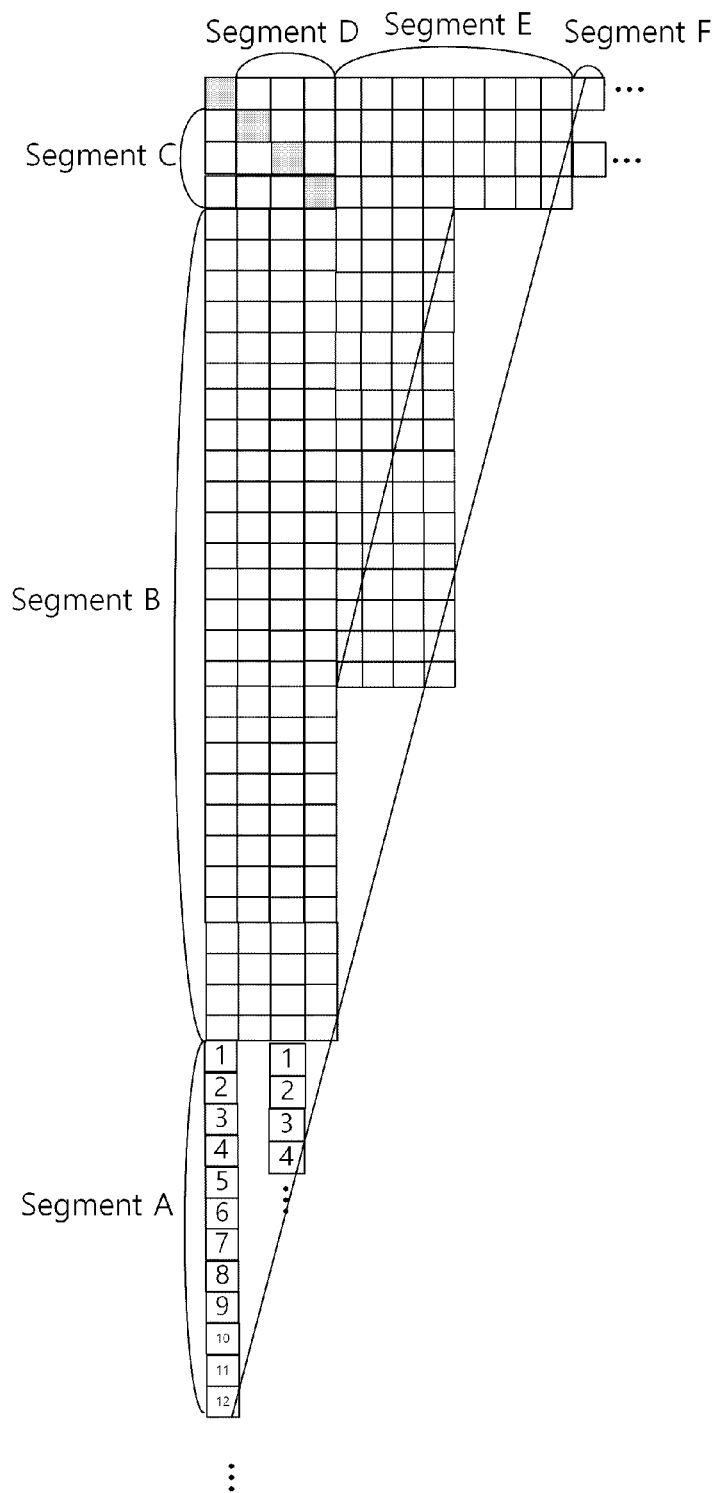
FIG. 27 is a diagram for describing a reference sample for a rectangular block, to which an MRL is applied, according to an embodiment of the present disclosure.

FIG. 27 is a diagram for describing a reference sample for a rectangular block, to which an MRL is applied, according to an embodiment of the present disclosure.

FIG. 27 shows a case of a rectangular in which W:H=1:4. The decoder or the encoder may apply, to segment A of a 1:4 block of FIG. 27, the methods applied to segment F of FIG. 25. The decoder or the encoder may apply, to segment F of FIG. 27, the methods applied to segment A of FIG. 25. An additional reference sample may be generated for all ratios on the basis of the methods described in FIG. 25 to FIG. 27, without limiting a width-to-height ratio of a vertical/horizontal rectangular prediction block.

Hereinafter, generation of multiple reference samples and an additional reference sample will be described in more detail.

If the index of the intra prediction mode is greater than or equal to 34, and an angle of the intra prediction mode mapped to the index of the intra prediction mode is greater than or equal to 0, the encoder or the decoder may generate multiple first reference samples and a first additional reference sample, based on a previously reconstructed upper block adjacent to the current block.

The index of the intra prediction mode refers to an index corresponding to the intra prediction mode. As already described, there may be 67 intra prediction modes. The intra prediction mode may be extended based on the size of the current block.

The angle of the intra prediction mode is an element mapped to the index of the intra prediction mode. The encoder or the decoder may map the index of the intra prediction mode to the angle of the intra prediction mode, based on a predetermined table. The index of the intra prediction mode may correspond to the intra prediction mode in a one-to-one manner. However, the angle of the intra prediction mode may correspond to the intra prediction mode in a one-to-many manner. That is, angles of intra prediction modes may represent different intra prediction modes. For example, if the index of the intra prediction mode is 18, and the index of the intra prediction mode is 50, the angle of the intra prediction mode may be 0.

The multiple first reference samples may be included in reference samples. The first additional reference sample may be included in the additional sample. The multiple first reference samples and the first additional reference sample may be obtained based on a previously reconstructed block located on at least one of the upper left, upper, or upper right of the current block.

If the index of the intra prediction mode is smaller than 34, and the angle of the intra prediction mode is greater than or equal to 0, the encoder or the decoder may generate multiple second reference samples and a second additional reference sample, based on a previously reconstructed left block adjacent to the current block.

The multiple second reference samples may be included in multiple reference samples. The second additional reference sample may be included in the additional sample. The multiple second reference samples and the second additional reference sample may be obtained based on a previously reconstructed block located on at least one of the lower left, left, or upper left of the current block.

More specifically, the encoder or the decoder may obtain multiple first reference samples, based on samples corresponding to positions of the multiple first reference samples among samples included in the previously reconstructed upper block. Samples corresponding to positions of the first reference samples may be samples included in at least one previously reconstructed block in the upper left, upper, or upper right block of the current block.

When a position of an upper left pixel of the current block is configured to be (0, 0), the positions of the previously reconstructed samples corresponding to the positions of the first reference samples may include (−1−refIdx+x, −1−refIdx). Here, x may be 0 to nTbW+refIdx+1. refIdx may be a reference sample line index. nTbW may refer to the width of the current block.

The positions of the previously restored samples corresponding to the positions of the first reference samples may further include (−1−refIdx+x, −1−refIdx). Here, x may be nTbW+2+refIdx to refW+refIdx. refIdx may be a reference sample line index. nTbW may refer to the width of the current block. refW may mean the width of the first reference sample.

The encoder or the decoder may obtain the first additional reference sample by padding a sample at the rightmost position from among the multiple first reference samples. The position of the rightmost sample among the first reference samples may include (−1+refW, −1−refIdx). If there are multiple first additional reference samples, the first additional reference samples may all have the same value. The encoder and the decoder may determine the number of first additional reference samples, based on a reference sample line index, a ratio of the width and height of the current block, and an offset. This has already been described above, and redundant descriptions will be thus omitted.

The encoder or the decoder may obtain multiple second reference samples, based on samples corresponding to positions of the multiple second reference samples among samples included in the previously reconstructed left block. Samples corresponding to positions of the second reference samples may be samples included in at least one previously reconstructed block in the lower left, left, or upper left block of the current block.

When a position of the upper left pixel of the current block is configured to be (0, 0), the positions of the previously restored samples corresponding to the positions of the second reference samples may include (−1−refIdx, −1−refIdx+x). Here, x may include 0 to nTbH+refIdx+1. refIdx may be a reference sample line index. nTbH may refer to the height of the current block.

The positions of the previously restored samples corresponding to the positions of the second reference samples may further include (−1−refIdx, −1−refIdx+x). Here, x may be nTbH+2+refIdx to refH+refIdx. refIdx may be a reference sample line index. nTbH may refer to the height of the current block. refH may refer to the height of the second reference sample.

The encoder and the decoder may obtain the second additional reference sample by padding a sample at the lowermost position from among the multiple second reference samples. The position of the lowermost sample among the second reference samples may include (−1−refIdx, −1+refH). If there are multiple second additional reference samples, the second additional reference samples may all have the same value. The encoder and the decoder may determine the number of second additional reference samples, based on a reference sample line index, a ratio of the width and height of the current block, and an offset. This has already been described above, and redundant descriptions will be thus omitted.

Hereinafter, cases of applying the methods proposed in FIG. 25 to FIG. 27 will be described in more detail.

The encoder or the decoder may generate predSamples[x][y] (with x=0 . . . nTbW−1, y=0 . . . nTbH−1) which are values of prediction samples, as follows.

If the index of the intra prediction mode is greater than or equal to 34, the encoder or the decoder performs the following procedures.
  1. The reference sample array ref[x] is specified as follows:
  The following applies:

ref[x]=p[−1−refIdx+x][−1−refIdx], with x=0 . . . nTbW+refIdx

If intraPredAngle is less than 0, the main reference sample array is extended as follows:
  When (nTbH*intraPredAngle)>>5 is less than −1, ref[x]=p[−1−refIdx][−1−refIdx+((x*invAngle+ 128)>>8)], with x=−1 . . . (nTbH*intraPredAngle)>>5    (8 35)

Otherwise, ref[x]=p[−1−refIdx+x][−1−refIdx], with x=nTbW+refIdx+1 . . . refW

When refIdx is greater than 0, additional reference samples ref[refW+x] with x=1 . . . (3*refIdx) may be padded as follows.

In consideration of a rectangular block, for the number of padded samples, if W/H>1 is satisfied instead of (3*refIdx), one of the methods applied to segment F of FIG. 25 is applied, and if W/H<1 is satisfied, one of the methods applied to segment A of FIG. 25 may be applied. The encoder or the decoder may perform padding as follows.

ref[refW+x]=p[−1−refIdx+refW][−1−refIdx]

2. The values of the prediction samples predSamples[x][y], with x=0 . . . nTbW−1, y=0 . . . nTbH−1 are derived as follows:
  The index variable iIdx and the multiplication factor iFact are derived as follows:

iIdx=((y+1+refIdx)*intraPredAngle)>>5 iFact=((y+1+refIdx)*intraPredAngle)&31

Depending on the value of iFact, the following applies:
  If iFact is not equal to 0, the value of the prediction samples predSamples[x][y] is derived as follows:

predSamples[x][y]=((32−iFact)*ref[x+iIdx+1]+ iFact*ref[x+iIdx+2]+16)>>5

Otherwise, the value of the prediction samples predSamples[x][y] is derived as follows:

predSamples[x][y]=ref[x+iIdx+1]

However, the present disclosure is not limited to the above method. If the index of the intra prediction mode is greater than or equal to 34, the encoder or the decoder performs the following procedures.
  1-1. The reference sample array ref[x] is specified as follows:
  The following applies:

ref[x]=p[−1−refIdx+x][−1−refIdx], with x=0 . . . nTbW+refIdx+1

If intraPredAngle is less than 0, the main reference sample array is extended as follows:

ref[x]=p[−1−refIdx][−1−refIdx+Min((x*invAngle+ 256)>>9,nTbH)], with x=−nTbH . . . 1

Otherwise, ref[x]=p[−1−refIdx+x][−1−refIdx], with x=nTbW+2+refIdx . . . refW+refIdx When refIdx is greater than 0, additional reference samples ref[refW+refIdx+x] with x=1 . . . (Max(1, nTbW/nTbH)*refIdx+1) may be padded as follows.

In consideration of a rectangular block, the number of padded samples may be (Max(1, nTbW/nTbH)*refIdx+1). The encoder or the decoder may perform padding as follows.

ref[refW+refIdx+x]=p[−1+refW][−1−refIdx]

2-1. The values of the prediction samples predSamples[x][y], with x=0 . . . nTbW−1, y=0 . . . nTbH−1 are derived as follows:
  The index variable iIdx and the multiplication factor iFact are derived as follows:

iIdx=(((y+1+refIdx)*intraPredAngle)>>5)+refIdx iFact=((y+1+refIdx)*intraPredAngle)&31

If cIdx is equal to 0, the following applies:
  The interpolation filter coefficients fT[j] with j=0 . . . 3 are derived as follows:

fT[j]=filterFlag?fG[iFact][j]:fC[iFact][j]

The value of the prediction samples predSamples[x][y] is derived as follows:

predSamples[x][y]=Clip1Y(((Σ$_{i=0}^{3}$fT[i]*ref[x+iIdx+ i])+32)>>6

Otherwise (cIdx is not equal to 0), depending on the value of iFact, the following applies:
  If iFact is not equal to 0, the value of the prediction samples predSamples[x][y] is derived as follows:

predSamples[x][y]=((32−iFact)*ref[x+iIdx+1]+ iFact*ref[x+iIdx+2]+16)>>5

Otherwise, the value of the prediction samples predSamples[x][y] is derived as follows:

predSamples[x][y]=ref[x+iIdx+1]

Unlike the above, if the index of the intra prediction mode is smaller than 34, the encoder or the decoder performs the following procedures.
  1. The reference sample array ref[x] is specified as follows:
  The following applies:

ref[x]=p[−1−refIdx][−1−refIdx+x], with x=0 . . . nTbH+refIdx

If intraPredAngle is less than 0, the main reference sample array is extended as follows:
  When (nTbW*intraPredAngle)>>5 is less than −1, ref[x]=p[−1−refIdx+((x*invAngle+128)>>8)][−1− refIdx], with x=−1 . . . (nTbW*intraPredAngle)>>5

Otherwise, ref[x]=p[−1−refIdx][−1−refIdx+x], with x=nTbH+refIdx+1 . . . refH

When refIdx is greater than 0, additional reference samples ref[refH+x] with x=1 . . . (3*refIdx) may be padded as follows.

In consideration of a rectangular block, for the number of padded samples, if W/H>1 is satisfied instead of (3*refIdx), one of the methods applied to segment A of FIG. 25 is applied, and if W/H<1 is satisfied, one of the methods applied to segment F of FIG. 25 is applied. The encoder or the decoder may perform padding as follows.

ref[refH+x]=p[−1−refIdx][−1−refIdx+refH]

However, the present disclosure is not limited thereto. If the index of the intra prediction mode is smaller than 34, the encoder or the decoder performs the following procedures.

1-1. The reference sample array ref[x] is specified as follows:
The following applies:

ref[x]=p[−1−refIdx][−1−refIdx+x], with x=0 . . . nTbH+refIdx+1

If intraPredAngle is less than 0, the main reference sample array is extended as follows:

ref[x]=p[−1−refIdx+Min((x*invAngle+256)>>9, nTbW)][−1−refIdx], with x=−nTbW . . . −1

Otherwise, ref[x]=p[−1−refIdx][−1−refIdx+x], with x=nTbH+2+refIdx . . . refH+refIdx When refIdx is greater than 0, additional reference samples ref[refH+x] with x=1 . . . (Max(1, nTbW/nTbH)*refIdx+1) may be padded as follows.

In consideration of a rectangular block, the number of padded samples may be (Max(1, nTbW/nTbH)*refIdx+2). The encoder or the decoder may perform padding as follows.

ref[refH+refIdx+x]=p[−1+refH][−1−refIdx]

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A device for decoding a video signal, the device comprising:
a processor,
wherein the processor is configured to:
obtain an intra prediction reference line index for a current block;
obtain an index of an intra prediction mode of the current block, wherein angle information of the intra prediction mode is obtained based on the index of the intra prediction mode;
obtain a plurality of reference samples and at least one additional reference sample based on the angle information of the intra prediction mode; and
perform intra prediction on the current block based on the plurality of reference samples and the at least one additional reference sample, and
wherein a number of the at least one additional reference sample is determined based on a product of the intra prediction reference line index and a value related to a ratio of a width and a height of the current block.

2. A device for encoding a video signal, the device comprising:
a processor,
wherein the processor is configured to obtain a bitstream to be decoded by a decoder using a decoding method,
wherein the decoding method comprises:
obtaining an intra prediction reference line index for a current block;
obtaining an index of an intra prediction mode of the current block, wherein angle information of the intra prediction mode is obtained based on the index of the intra prediction mode;
obtaining a plurality of reference samples and at least one additional reference sample based on the angle information of the intra prediction mode; and
performing intra prediction on the current block based on the plurality of reference samples and the at least one additional reference sample, and
wherein a number of the at least one additional reference sample is determined based on a product of the intra prediction reference line index and a value related to a ratio of a width and a height of the current block.

3. A non-transitory computer-readable storage medium storing a bitstream, the bitstream being decoded by a decoding method, wherein the decoding method comprises:

obtaining an intra prediction reference line index for a current block;

obtaining an index of an intra prediction mode of the current block, wherein angle information of the intra prediction mode is obtained based on the index of the intra prediction mode;

obtaining a plurality of reference samples and at least one additional reference sample based on the angle information of the intra prediction mode; and performing intra prediction on the current block based on the plurality of reference samples and the at least one additional reference sample, and wherein a number of the at least one additional reference sample is determined based on a product of the intra prediction reference line index and a value related to a ratio of a width and a height of the current block.

* * * * *